United States Patent
Xiao et al.

(10) Patent No.: US 12,223,972 B2
(45) Date of Patent: Feb. 11, 2025

(54) VOICE PROCESSING METHOD AND APPARATUS, ELECTRONIC DEVICE, AND COMPUTER-READABLE STORAGE MEDIUM

(71) Applicant: TENCENT TECHNOLOGY (SHENZHEN) COMPANY LIMITED, Shenzhen (CN)

(72) Inventors: Wei Xiao, Shenzhen (CN); Meng Wang, Shenzhen (CN); Ling Zhu, Shenzhen (CN); Wenlong Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 377 days.

(21) Appl. No.: 17/714,485

(22) Filed: Apr. 6, 2022

(65) Prior Publication Data

US 2022/0230646 A1 Jul. 21, 2022

Related U.S. Application Data

(63) Continuation of application No. PCT/CN2021/087008, filed on Apr. 13, 2021.

(30) Foreign Application Priority Data

May 15, 2020 (CN) .................. 202010416636.X

(51) Int. Cl.
*G10L 21/00* (2013.01)
*G06N 3/045* (2023.01)
(Continued)

(52) U.S. Cl.
CPC .............. *G10L 21/00* (2013.01); *G06N 3/045* (2023.01); *G10L 25/18* (2013.01); *G10L 25/30* (2013.01); *H04L 65/60* (2013.01); *H04L 65/80* (2013.01)

(58) Field of Classification Search
CPC ......... G10L 21/00; G10L 25/18; G10L 25/30; G10L 19/04; G10L 19/005;
(Continued)

(56) References Cited

U.S. PATENT DOCUMENTS 6,408,267 B1 6/2002 Proust
7,778,824 B2 8/2010 Mo et al.
(Continued)

FOREIGN PATENT DOCUMENTS

CN 1983909 A 6/2007
CN 106788876 A 5/2017
(Continued)

OTHER PUBLICATIONS

The World Intellectual Property Organization (WIPO) International Search Report for PCT/CN2021/087008 Jul. 15, 2021 8 Pages (including translation).
(Continued)

*Primary Examiner* — Linda Wong
(74) *Attorney, Agent, or Firm* — ANOVA LAW GROUP PLLC

(57) ABSTRACT

A voice processing method includes: determining a historical voice frame corresponding to a target voice frame; acquiring a frequency-domain characteristic of the historical voice frame and a time-domain parameter of the historical voice frame; obtaining a parameter set of the target voice frame according to a correlation between the frequency-domain characteristic of the historical voice frame and the time-domain parameter of the historical voice frame, the
(Continued)

parameter set including at least two parameters; and reconstructing the target voice frame according to the parameter set.

18 Claims, 10 Drawing Sheets

(51) Int. Cl.
*G10L 25/18* (2013.01)
*G10L 25/30* (2013.01)
*H04L 65/60* (2022.01)
*H04L 65/80* (2022.01)

(58) Field of Classification Search
CPC ... G10L 19/0017; G10L 21/003; G10L 21/02; G06N 3/045; G06N 3/044; G06N 3/08; H04L 65/60; H04L 65/80; H04L 65/70; H04L 65/765; H04M 15/56
See application file for complete search history.

(56) References Cited

U.S. PATENT DOCUMENTS

| | | | |
|---|---|---|---|
| 9,294,060 B2* | 3/2016 | Myllyla | G10L 21/038 |
| 9,691,396 B2* | 6/2017 | Liu | G10L 19/083 |
| 2004/0010407 A1 | 1/2004 | Kovesi et al. | |
| 2008/0126904 A1 | 5/2008 | Sung et al. | |
| 2016/0240215 A1* | 8/2016 | Suess | G10L 13/04 |
| 2016/0247506 A1 | 8/2016 | Lecomte et al. | |
| 2016/0365097 A1 | 12/2016 | Guan et al. | |
| 2017/0169833 A1 | 6/2017 | Lecomte et al. | |
| 2018/0366138 A1* | 12/2018 | Ramprashad | G10L 21/0208 |
| 2020/0243102 A1 | 7/2020 | Schmidt et al. | |
| 2022/0059107 A1* | 2/2022 | Mustafa | G06N 3/088 |

FOREIGN PATENT DOCUMENTS

| | | |
|---|---|---|
| CN | 111554309 A | 8/2020 |
| WO | 2019081070 A1 | 5/2019 |

OTHER PUBLICATIONS

Pablo Barrera et al., "Improving Audio Quality in Duo with WaveNetEQ," ai.googleblog.com, Apr. 1, 2020, Retrieved from the Internet: URL: http://ai.googleblog.com/2020/04/improving-audio-quality-in-duo-with.html, [retrieved on Apr. 5, 2022]. 5 pages.

W. Bastiaan Kleijn et al., "Wavenet Based Low Rate Speech Coding," ICASSP 2018, Dec. 31, 2018 (Dec. 31, 2018), section 2.1. 5 pages.

Bong-Ki Lee et al., "Packet Loss Concealment Based on Deep Neural Networks for Digital Speech Transmission," IEEE/ACM Transactions on Audio, Speech, and Language Processing, vol. 24, No. 2, Feb. 28, 2016 (Feb. 28, 2016). 10 pages.

Xuesu Xiao et al., "Packet Loss Concealment with Recurrent Neural Networks for Wireless Inertial Pose Tracking," 2018 IEEE 15th International Conference on Wearable and Implantable Body Sensor Networks (BSN), Mar. 7, 2018 (Mar. 7, 2018). 5 pages.

The State Intellectual Property Office of the People's Republic of China (SIPO) Office Action 1 for 202010416636.X Jun. 1, 2024 17 Pages (including translation).

"Pablo Barrera, Improving Audio Quality in Duo with WaveNetEQ", http://ai.googleblog.com/2020/04/improving-audio-quality-in-duo-with.html, Apr. 30, 2020 (Apr. 30, 2020).

* cited by examiner

VOICE PROCESSING METHOD AND APPARATUS, ELECTRONIC DEVICE, AND COMPUTER-READABLE STORAGE MEDIUM

RELATED APPLICATION(S)

This application is a continuation application of PCT Patent Application No. PCT/CN2021/087008 filed on Apr. 13, 2021, which claims priority to China Patent Application No. 202010416636.X, filed on May 15, 2020, all of which are incorporated herein by reference in entirety.

FIELD OF THE TECHNOLOGY

The present disclosure relates to Internet technologies, and in particular, to a voice processing method and apparatus, an electronic device, and a computer-readable storage medium.

BACKGROUND

Voice over Internet Protocol (VoIP) is a voice communication technology to achieve voice communication and a multimedia conference by using the Internet Protocol (IP), that is to say, to communicate by using the Internet.

Sound quality may be impaired during transmission of a voice signal by using a VoIP system. The impairment of sound quality means that a normal voice signal from a transmitting terminal encounters abnormality such as playback lag and disruptions at a receiving terminal side after being transmitted to the receiving terminal. The processing capability for the impairment of sound quality in certain existing technologies is limited and is not readily adaptive to diverse voice signal transmission scenarios. In certain existing technologies, a mainstream solution to resolve the impairment of sound quality is the PLC technology. A mechanism is as follows: if the receiving terminal does not receive an $n^{th}$ (n is a positive integer) voice frame, the receiving terminal performs signal analysis on an $(n-1)^{th}$ voice frame to compensate for the $n^{th}$ voice frame. However, it is found by practice that, due to the limited signal analysis capability, the voice processing capability of the PLC technology is limited and is not readily amenable a scenario involving a sudden packet loss in the existing network.

SUMMARY

Embodiments of the present disclosure provide a voice processing method and apparatus, an electronic device, and a computer-readable storage medium, which can improve the voice processing capability.

In one aspect, the present disclosure provides a voice processing method. The method includes: determining a historical voice frame corresponding to a target voice frame; acquiring a frequency-domain characteristic of the historical voice frame and a time-domain parameter of the historical voice frame; obtaining a parameter set of the target voice frame according to a correlation between the frequency-domain characteristic of the historical voice frame and the time-domain parameter of the historical voice frame, the parameter set including at least two parameters; and reconstructing the target voice frame according to the parameter set.

In another aspect, the present disclosure provides a voice processing method. The method includes: receiving a voice signal transmitted by a Voice over Internet Protocol (VoIP) system; reconstructing a target voice frame by using the above method when in response to determining that the target voice frame in the voice signal is lost; and outputting the voice signal based on the reconstructed target voice frame.

In yet another aspect, the present disclosure provides a voice processing apparatus, comprising: a memory storing computer program instructions; and a processor coupled to the memory and configured to execute the computer program instructions and perform: determining a historical voice frame corresponding to a target voice frame; acquiring a frequency-domain characteristic of the historical voice frame and a time-domain parameter of the historical voice frame; obtaining a parameter set of the target voice frame according to a correlation between the frequency-domain characteristic of the historical voice frame and the time-domain parameter of the historical voice frame, the parameter set including at least two parameters; and reconstructing the target voice frame according to the parameter set.

In yet another aspect, the present disclosure provides a non-transitory computer-readable storage medium storing computer program instructions executable by at least one processor to perform: determining a historical voice frame corresponding to a target voice frame; acquiring a frequency-domain characteristic of the historical voice frame and a time-domain parameter of the historical voice frame; obtaining a parameter set of the target voice frame according to a correlation between the frequency-domain characteristic of the historical voice frame and the time-domain parameter of the historical voice frame, the parameter set including at least two parameters; and reconstructing the target voice frame according to the parameter set.

The embodiments of the present disclosure have the following beneficial effects:

When the target voice frame in the voice signal is desirable to be reconstructed, the parameter set of the target voice frame may be predicted according to the correlation between the frequency-domain characteristic of the historical voice frame corresponding to the target voice frame and the time-domain parameter of the historical voice frame, and then inter-parameter filtering is performed on the parameter set to reconstruct the target voice frame. The time and frequency characteristics of the historical voice frame are comprehensively analyzed, and the correlation between the time characteristic and the frequency characteristic of the historical voice frame is used, to reconstruct the target voice frame. The reconstruction process is efficient and is applicable to a communication scenario having a high real-time requirement.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

Figure 1:
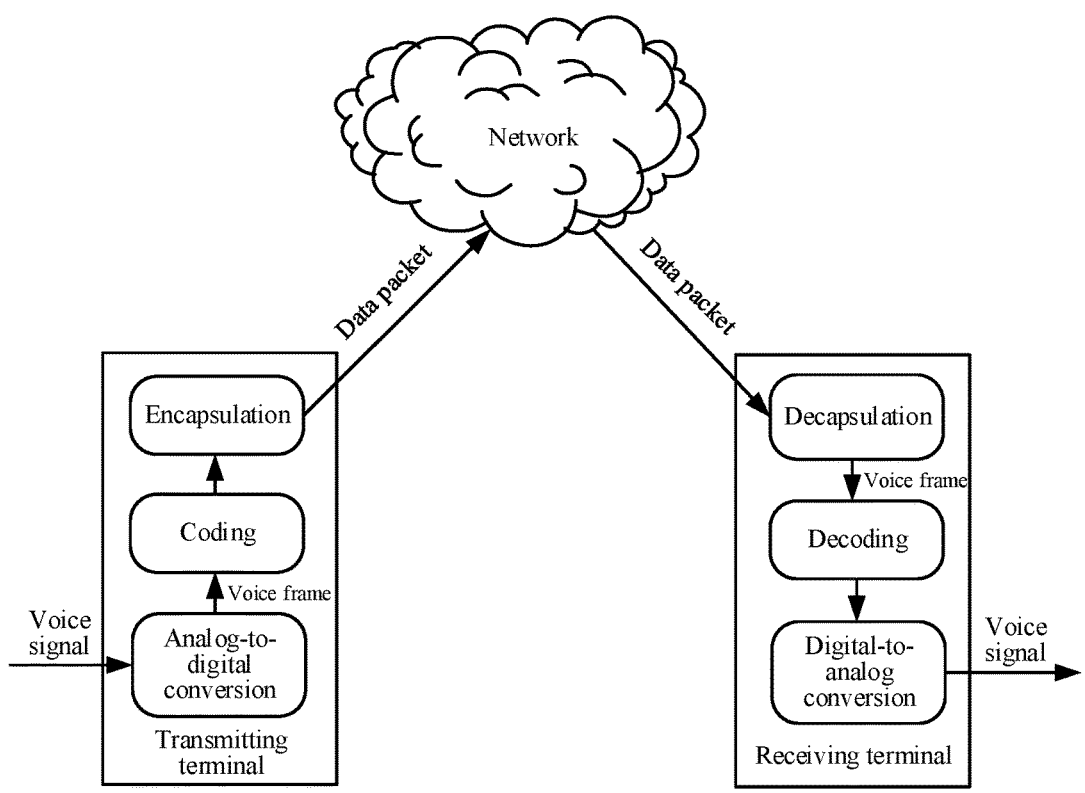
FIG. 1 is a schematic structural diagram of a Voice over Internet Protocol (VoIP) system according to an exemplary embodiment of the present disclosure.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

In the following descriptions, the included term "first/second" is merely intended to distinguish similar objects but does not necessarily indicate a specific order of an object. It may be understood that "first/second" is interchangeable in terms of a specific order or sequence if permitted, so that the embodiments of the present disclosure described herein can be implemented in a sequence in addition to the sequence shown or described herein. In the following description, the term "plurality" means at least two.

Unless otherwise defined, meanings of technical and scientific terms used in the present disclosure are the same as those usually understood by a person skilled in the art to which the present disclosure belongs. Terms used in the present disclosure are merely intended to describe objectives of the embodiments of the present disclosure, but are not intended to limit the present disclosure.

1) Forward error correction (FEC): the forward error correction coding technology has characteristics such as introducing a gain coding technology such as cascaded channel coding, and can automatically correct a transmission error code. The core idea of FEC is that a transmitter uses an error correction code to redundantly code information.

2) Linear predictive coding (LPC) is a tool used in audio signal processing and voice processing to express a spectral envelope of a digital voice signal in a compressed form according to information of a linear predictive model. The LPC is one of the most effective voice analysis technologies and one of the most useful methods for coding a high-quality voice at a low bit rate. LPC provides a more accurate voice parameter prediction.

3) Packet loss concealment (PLC) is a technology for concealing impact of packet loss. A voice signal is split into packets and transmitted in a Voice over Internet protocol (VoIP) network. When packet loss occurs, a current lost frame is approximately replaced by pitch synchronous repetition according to decoded information of a previous frame to achieve PLC.

The technical solutions in the embodiments of the present disclosure are clearly and described in the following with reference to the accompanying drawings in the embodiments of the present disclosure. Apparently, the described embodiments are merely some rather than all of the embodiments of the present disclosure. Other embodiments obtained by persons of ordinary skill in the art based on the embodiments of the present disclosure without creative efforts shall fall within the protection scope of the present disclosure.

The embodiments of the present disclosure relate to the VoIP. The VoIP is a voice communication technology to achieve voice communication and a multimedia conference by using the Internet Protocol (IP), that is to say, to communicate by using the Internet. The VoIP may alternatively be referred to as IP telephony, Internet telephony, voice of Internet phone, broadband telephony, or broadband telephony service. FIG. 1 is a schematic structural diagram of a VoIP system according to an exemplary embodiment of the present disclosure. The system includes a transmitting terminal and a receiving terminal. The transmitting terminal is a terminal or a server that initiates a voice signal to be transmitted by the VoIP system. Correspondingly, the receiving terminal is a terminal or a server that receives the voice signal transmitted by the VoIP. The terminal herein may include, but is not limited to, a mobile phone, a personal computer (PC), or a personal digital assistant (PDA). Processing of the voice signal in the VoIP system is substantially as follows:

An inputted voice signal is collected on the transmitting terminal side. For example, the inputted voice signal may be collected by using a microphone. The voice signal is an analog signal. Analog-to-digital conversion is performed on the voice signal to obtain a digital signal. The digital signal is coded to obtain a plurality of voice frames. The coding herein may be OPUS coding. OPUS is an impaired sound coding format, which is applicable to real-time sound transmission over the network. OPUS has the following main characteristics: ① supporting a sampling rate range from 8000 Hz (a narrowband signal) to 48000 Hz (a full frequency signal); ② supporting a constant bit rate and a variable bit rate; ③ supporting a narrow audio bandwidth to a full frequency audio bandwidth; ④ supporting voice and music; ⑤ allowing dynamic adjustment of a bit rate, an audio bandwidth, and a frame size; and ⑥ having a desirable robustness loss rate and a desirable PLC capability. Due to the PLC capability and the excellent VoIP sound quality of OPUS, OPUS coding is usually used in the VoIP system. The sampling rate (Fs) in the coding process may be set according to an actual implementation. Fs may be 8000 hertz (Hz), 16000 Hz, 32000 Hz, 48000 Hz, or the like. Generally, a frame length of the voice frame depends on a structure of a coder used in the coding process. The frame length of a voice frame may be, for example, 10 milliseconds (ms), 20 ms, or the like. A plurality of voice frames are encapsulated or packaged into one or more IP data packets. The IP data packets are transmitted to the receiving terminal by using the network.

The receiving terminal side receives the IP data packets transmitted by using the network, and decapsulates the received IP data packets to obtain a plurality of voice frames. The voice frames are decoded and restored to digital signals. Digital-to-analog conversion is performed on the digital signals, so that the digital signals are restored to analog voice signals and outputted. For example, the output herein may be playback by using a speaker.

In certain existing technologies, sound quality may be impaired during transmission of the voice signal by using the VoIP system. The impairment of sound quality means that a normal voice signal from a transmitting terminal encounters abnormality such as playback lag and unsmoothness on a receiving terminal side after being transmitted to the receiving terminal. The applicants found that a vital factor causing the impairment of sound quality is the network during implementation of the embodiments of the present disclosure. During transmission of a data packet, instability or abnormality of the network causes the receiving terminal to fail to receive the data packet normally and causes loss of a voice frame in the data packet. Therefore, the receiving terminal cannot restore the voice signal, resulting in abnormality such as lag during outputting of the voice signal. Certain existing technologies provide the following solutions for the impairment of sound quality:

The first solution involves the FEC technology. The FEC technology is usually deployed at the transmitting terminal. After the transmitting terminal packs and transmits an $n^{th}$ (n is a positive integer) voice frame, a specific bandwidth is still assigned to a next data packet to pack and transmit the $n^{th}$ voice frame again. The repackaged data packet is referred to as a "redundant packet". Information of the $n^{th}$ voice frame encapsulated or packaged in the redundant packet is referred to as redundant information of the $n^{th}$ voice frame. In order to save the transmission bandwidth, a precision of the $n^{th}$ voice frame may be reduced, and the information of the $n^{th}$ voice frame having a lower precision is packed into the redundant packet. During voice transmission, if the $n^{th}$ voice frame is lost, the receiving terminal may wait for the redundant packet of the $n^{th}$ voice frame to arrive, reconstruct the $n^{th}$ voice frame according to the redundant information of the $n^{th}$ voice frame in the redundant packet, and restore the corresponding voice signal. The FEC technology may be classified into in-band FEC and out-of-band FEC. The in-band FEC means storing the redundant information by using an idle byte in a voice frame. The out-of-band FEC means storing the redundant information by using a digital packet encapsulation or packaging technology outside a structure of a voice frame. The applicants found that resolving the impairment of sound quality based on the FEC technology has the following technical problems during the implementation of the embodiments of the present disclosure: an additional bandwidth is desirable to code the redundant information, an additional delay is generated when the receiving terminal waits for the redundant information, and a different coding mechanism requires specific FEC for adaptation, which is costly and inflexible.

Another solution to the impairment of sound quality is the PLC technology. The PLC technology is usually deployed at the receiving terminal. If the receiving terminal does not receive the $n^{th}$ voice frame, the receiving terminal reads the $(n-1)^{th}$ voice frame, and performs signal analysis on the $(n-1)^{th}$ voice frame to compensate for the $n^{th}$ voice frame. Compared with the FEC technology, the PLC technology does not require an additional bandwidth. However, it is found by practice that resolving the impairment of sound quality based on the PLC technology has the following technical problems: since the signal analysis capability is limited, the PLC technology is applicable to only scenarios in which one voice frame is lost. However, in the existing network, a packet loss occurs suddenly (that is to say, a plurality of consecutive frames are lost). In this implementation, the above PLC technology is ineffective in dealing with the impairment of sound quality.

In view of the above technical problems, an embodiment of the present disclosure provides a voice processing method. The voice processing method has the following improvements compared to certain existing technologies: ① The signal analysis technology is combined with a deep learning technology to improve the voice processing capability. ② Modeling is performed based on the data of the voice signal to obtain a network model, and deep learning is performed on a historical voice frame to predict a parameter set of a target voice frame, so as to reconstruct a target voice frame according to the parameter set of the target voice frame. The reconstruction process is efficient, and is applicable to a communication scenario having a high real-time requirement. ③ The parameter set used to reconstruct the target voice frame includes two or more parameters, so that the learning target of the network model is decomposed into a plurality of parameters. Each parameter corresponds to a different neural network for learning. A different neural network may be flexibly configured and combined according to a different parameter set to form a structure of the network model. In this way, the network structure can be greatly simplified, and the processing complexity can be effectively reduced. ④ Continuous PLC is supported. That is to say, when a plurality of consecutive frames are lost, the plurality of consecutive frames can be reconstructed to ensure the quality of voice communication. ⑤ Combination with the FEC technology for use is supported. Flexible combinations are provided to avoid the adverse effect caused by the impairment of sound quality.

The voice processing method provided in this embodiment of the present disclosure is described in detail below with reference to the accompanying drawings.

Figure 2A:
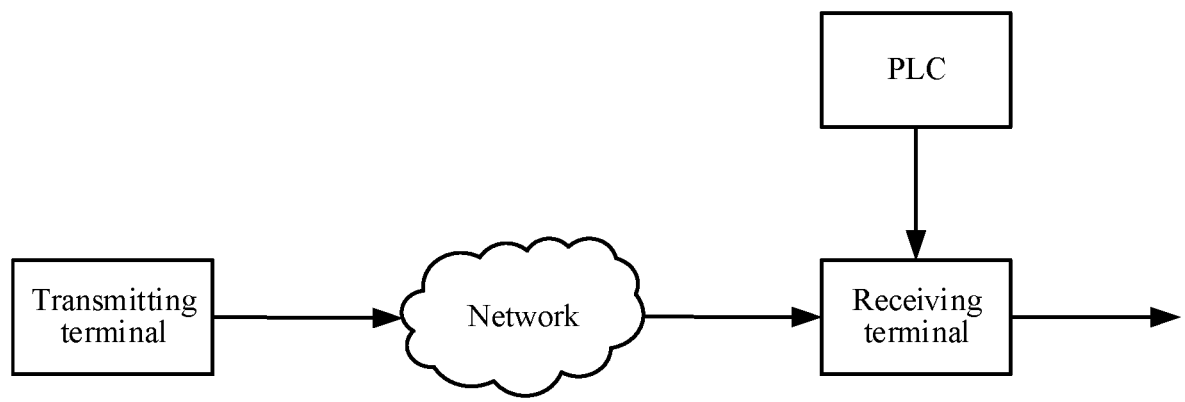
FIG. 2A is a schematic structural diagram of a voice processing system according to an exemplary embodiment of the present disclosure.

FIG. 2A is a schematic structural diagram of a voice processing system according to an exemplary embodiment of the present disclosure. As shown in FIG. 2A, the voice processing method provided in this embodiment of the present disclosure is deployed on a downlink receiving terminal side. A transmitting terminal collects an inputted voice signal, performs analog-to-digital conversion on the voice signal to obtain a digital signal, codes the digital signal to obtain a plurality of voice frames, and encapsulates or packages the plurality of voice frames into one or more IP data packets. The IP data packet is transmitted to the receiving terminal by using the network. A user terminal on the receiving side receives the IP data packet transmitted by using the network, to perform the voice processing method provided in this embodiment of the present disclosure. The reason for deploying the voice processing method provided in this embodiment of the present disclosure on the user terminal on the receiving side is as follows: 1) The receiving terminal is a last link of end-to-end communication in the system. After a reconstructed target voice frame is restored to a voice signal and outputted (for example, played by using a speaker, a loudspeaker, or the like), a user can intuitively perceive voice quality of the voice signal. 2) In the field of mobile communication, a communication link from a downlink air interface to the receiving terminal is a node most prone to a quality problem. Therefore, performing the voice processing method at the node can directly improve the sound quality.

In some embodiments, the voice processing method provided in this embodiment of the present disclosure is deployed on a server on the receiving terminal side. A transmitting terminal collects an inputted voice signal, performs analog-to-digital conversion on the voice signal to obtain a digital signal, codes the digital signal to obtain a plurality of voice frames, and encapsulates or packages the plurality of voice frames into one or more IP data packets. The IP data packet is transmitted to the server on the receiving side by using the network. The server on the receiving side receives the IP data packet transmitted by using the network. The voice processing method provided in this embodiment of the present disclosure is performed by the server, and the reconstructed target voice frame is returned to the user terminal for output. The reason for deploying the voice processing method provided in this embodiment of the present disclosure on the server is as follows: The server has more processing resources than the terminal. Therefore, the target voice frame reconstruction can be performed more efficiently by using the server.

Figure 2B:
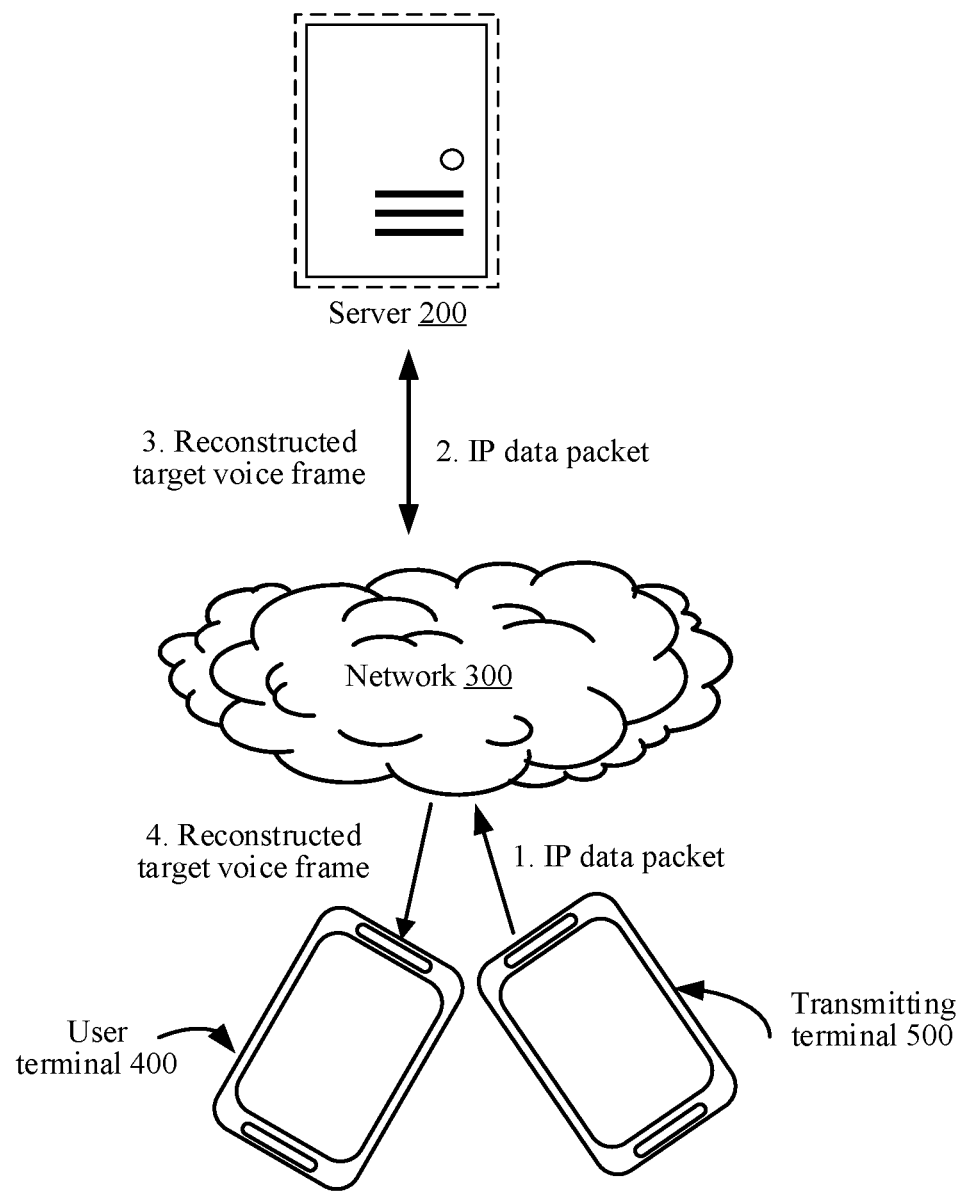
FIG. 2B is a schematic architectural diagram of the voice processing system according to an embodiment of the present disclosure.

Referring to FIG. 2B, FIG. 2B is a schematic architectural diagram of the voice processing system according to an embodiment of the present disclosure. In a voice communication scenario of a social client, a transmitting terminal 500 collects an inputted voice signal, performs analog-to-digital conversion on the voice signal to obtain a digital signal, codes the digital signal to obtain a plurality of voice frames, and encapsulates or packages the plurality of voice frames into one or more IP data packets. The IP data packet is transmitted to a server 200 on the receiving side by using a network 300. The server 200 on the receiving side receives the IP data packet transmitted by using the network. The voice processing method provided in this embodiment of the present disclosure is performed by the server 200, and the reconstructed target voice frame is returned to the user terminal 400 on the receiving side for output. The reason for deploying the voice processing method provided in this embodiment of the present disclosure on the server is as follows: The server has more processing resources than the terminal. Therefore, the target voice frame reconstruction can be performed more efficiently by using the server.

In some embodiments, the server may be an independent physical server, a server cluster composed of a plurality of physical servers, a distributed system, or a cloud server that provides cloud computing services such as a cloud service, a cloud database, cloud computing, a cloud function, cloud storage, a network service, cloud communication, a middleware service a domain name service, a security service, a content delivery network (CDN), big data, and an artificial intelligence platform. The terminal may be various types of terminals such as a notebook computer, a tablet computer, a desktop computer, a set-top box, a mobile device (such as a mobile phone, a portable music player, a personal digital assistant, a dedicated messaging device, or a portable game device), or the like, but is not limited thereto. The terminal and the server may be directly or indirectly connected in a wired or wireless communication manner. This is not limited in this embodiment of the present disclosure.

Figure 3:
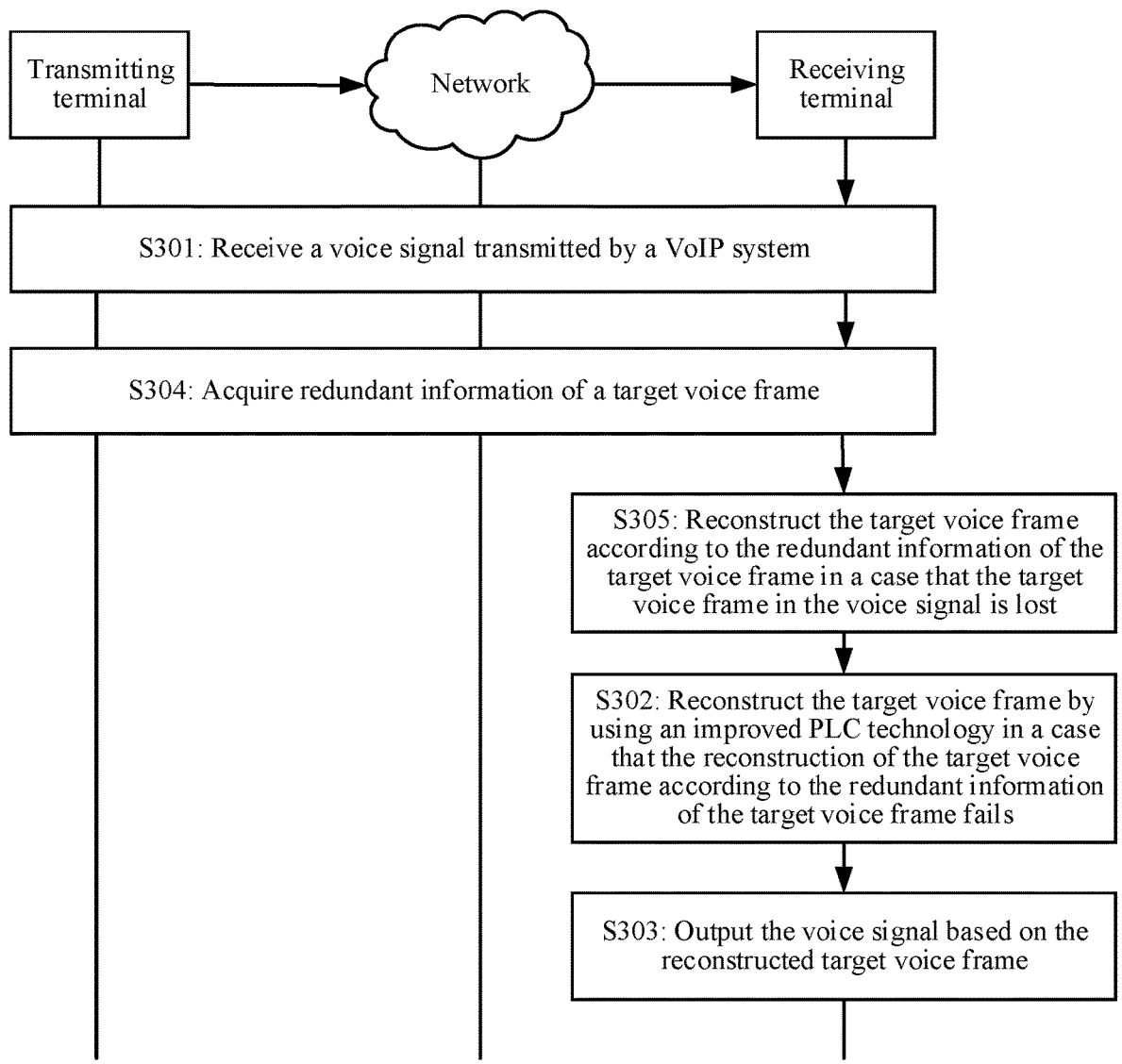
FIG. 3 is a flowchart of a voice processing method according to an exemplary embodiment of the present disclosure.

FIG. 3 is a flowchart of a voice processing method according to an exemplary embodiment of the present disclosure. Since the improved PLC technology is deployed at the downlink receiving terminal, the process shown in FIG. 3 is performed by the receiving terminal shown in FIG. 2A. The receiving terminal is a terminal or a server. The method includes the following steps S301-S303.

S301: Receive a voice signal transmitted by a VoIP system.

The voice signal is transmitted from the transmitting terminal to the receiving terminal by using the network. It may be learned from the above processing in the VoIP system that, the voice signal received by the receiving terminal is a voice signal in a form of an IP data packet. The receiving terminal decapsulates the IP data packet to obtain a voice frame.

S302: Reconstruct a target voice frame by using the voice processing method provided in this embodiment of the present disclosure when in response to determining that the target voice frame in the voice signal is lost. In this embodiment of the present disclosure, an $n^{th}$ voice frame is used to represent the target voice frame.

S303: Output the voice signal based on the reconstructed target voice frame.

After reconstructing the target voice frame, the receiving terminal decodes and performs digital-to-analog conversion on the target voice frame, and finally plays the voice signal by using a speaker, a loudspeaker, or the like. In this way, restoration and output of the voice signal are realized.

In an implementation, the voice processing method provided in this embodiment of the present disclosure may be used alone. In this implementation, when the receiving terminal determines that the $n^{th}$ voice frame is lost, the PLC function is activated. The $n^{th}$ voice frame is reconstructed by means of the processing in the voice processing method provided in this embodiment of the present disclosure (that is, the above step S303). In another implementation, the voice processing method provided in this embodiment of the present disclosure may be used in combination with the FEC technology. In this implementation, the process shown in FIG. 3 may further include the following steps S304-S305:

S304: Acquire redundant information of the target voice frame.

S305: Reconstruct the target voice frame according to the redundant information of the target voice frame when in response to determining that the target voice frame in the voice signal is lost. If reconstructing the target voice frame according to the redundant information of the target voice frame fails, step S302 is triggered again to reconstruct the target voice frame by using the voice processing method provided in this embodiment of the present disclosure.

In a scenario where the voice processing method provided in this embodiment of the present disclosure is used in combination with the FEC technology, an FEC operation is performed at the transmitting terminal. That is to say, not only the $n^{th}$ voice frame is packaged and transmitted, but also the redundant information of the $n^{th}$ voice frame is packaged and transmitted. When the $n^{th}$ voice frame is lost, the receiving terminal first attempts to reconstruct and restore the $n^{th}$ voice frame by using the redundant information of the $n^{th}$ voice frame. If the $n^{th}$ voice frame cannot be successfully restored, the voice processing method provided in this embodiment of the present disclosure is activated again. The $n^{th}$ voice frame is reconstructed by means of the processing in the voice processing method provided in this embodiment of the present disclosure.

In this embodiment of the present disclosure, when the target voice frame in the VoIP voice signal is lost, the voice processing method provided in this embodiment of the present disclosure may be used to reconstruct the target voice frame. The reconstruction process is relatively simple and efficient, and is applicable to a communication scenario having a high real-time requirement. In addition, the voice processing method provided in this embodiment of the present disclosure supports continuous PLC. That is to say, when a plurality of consecutive frames are lost, the plurality of consecutive frames can be reconstructed to ensure the quality of voice communication. Moreover, the voice processing method provided in this embodiment of the present disclosure may be used in combination with the FEC technology. Flexible combinations are provided to avoid the adverse effect caused by the impairment of sound quality.

The voice processing method provided in this embodiment of the present disclosure is described in detail below with reference to the accompanying drawings.

Figure 4:
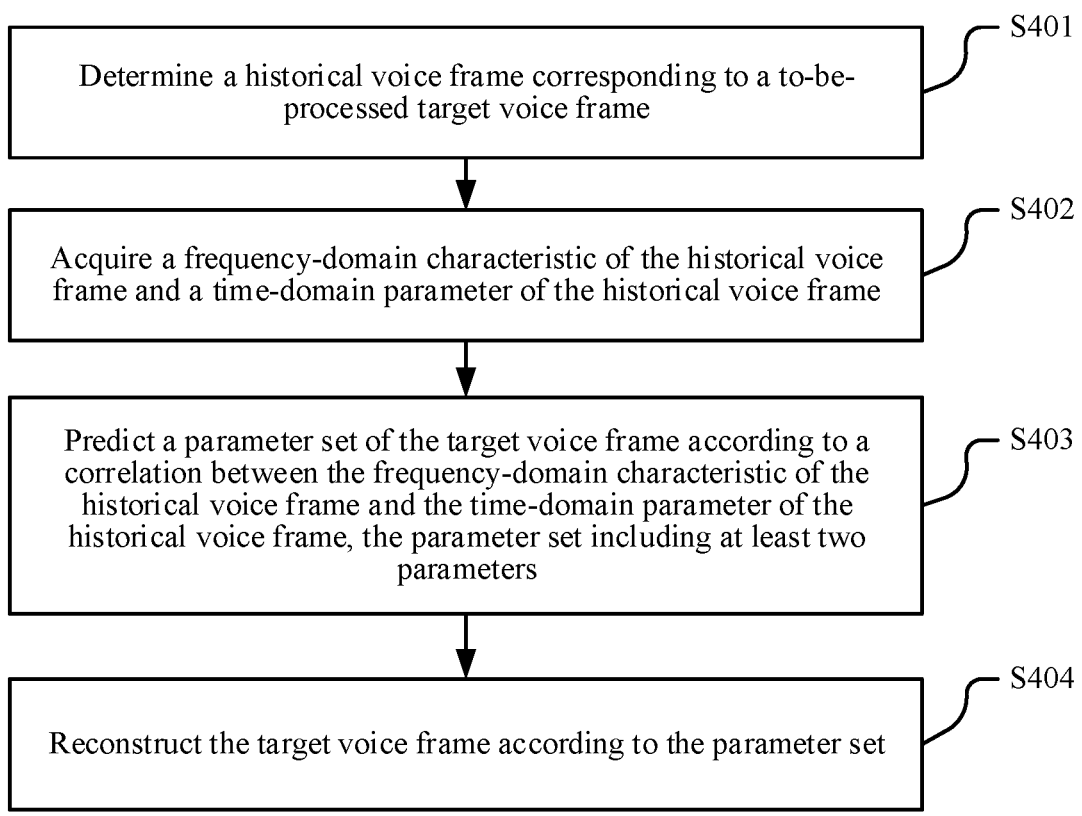
FIG. 4 is a flowchart of a voice processing method according to another exemplary embodiment of the present disclosure.

FIG. 4 is a flowchart of a voice processing method according to another exemplary embodiment of the present disclosure. The method is performed by the receiving terminal shown in FIG. 2A; The receiving terminal is a terminal or a server. The method includes the following steps S401-S404.

S401: Determine a historical voice frame corresponding to a to-be-processed target voice frame.

In certain embodiment(s), the term "to-be-processed target voice frame" is interchangeable with the term "target voice frame."

When the voice signal transmitted by the VoIP system has a lost frame, the lost voice frame is determined as the target voice frame. The historical voice frame is a voice frame transmitted before the target voice frame and can be successfully restored to obtain the voice signal. In embodiments of the present disclosure, description is provided by using an example that the target voice frame is the $n^{th}$ (n is a positive integer) voice frame in the voice signal transmitted by the VoIP system and, the historical voice frame includes t (t is a positive integer) voice frames: an $(n-t)^{th}$ voice frame to an $(n-1)^{th}$ voice frame of the voice signal transmitted by the VoIP system. A value of t may be set according to an actual implementation. The value of t is not limited in this embodiment of the present disclosure. For example, in order to reduce the calculation difficulty, the value of t may be set relatively small, for example, t=2. That is to say, adjacent two frames before the $n^{th}$ frame are selected as the historical voice frame. In order to obtain a more accurate calculation result, the value of t may be set relatively large, for example, t=n−1. That is to say, frames before the $n^{th}$ frame are selected as the historical voice frame.

S402: Acquire a frequency-domain characteristic of the historical voice frame and a time-domain parameter of the historical voice frame.

The time-domain parameter is a parameter used to represent a time-domain characteristic of a time-domain signal. The time-domain parameter includes, but is not limited to at least one of a short-term correlation parameter, a long-term correlation parameter, or an energy parameter. For definitions of the time-domain parameters, refer to description in the subsequent embodiments. The historical voice frame is a time-domain signal. The time-domain parameter of the historical voice frame is a parameter used to reflect the time-domain characteristic of the historical voice frame. The time-domain parameter of the historical voice frame may include, but is not limited to a short-term correlation parameter, a long-term correlation parameter, and an energy parameter of the historical voice frame. In addition, in order to obtain the frequency-domain characteristic of the historical voice frame, time-frequency transform is desirable to be performed on the historical voice frame. The time-frequency transform is used to transform the historical voice frame from a time-domain space to a frequency-domain space. In this way, the frequency-domain characteristic of the historical voice frames can be obtained in the frequency-domain space. The time-frequency transform herein may be performed by operations such as Fourier transform or short-term Fourier transform (STFT). For example, the time-frequency transform is performed on the historical voice frame by the Fourier transform. The frequency-domain characteristic of the historical voice frame may include an STFT coefficient of the historical voice frame. In an implementation, the frequency-domain characteristic of the historical voice frame further includes an amplitude spectrum of the STFT coefficient of the historical voice frame, to simplify complexity of the voice processing.

S403: Predict a parameter set of the target voice frame according to a correlation between the frequency-domain characteristic of the historical voice frame and the time-domain parameter of the historical voice frame, the parameter set including at least two parameters.

The correlation between the frequency-domain characteristic of the historical voice frame and the time-domain parameter of the historical voice frame means that the frequency-domain characteristic of the historical voice frame and the time-domain parameter of the historical voice frame interact with each other and affect a predicted result of the parameter set of the target voice frame during the prediction of the parameter set of the target voice frame. The parameter set of the target voice frame includes at least two parameters. The parameters in the parameter set are time-domain parameters of the target voice frame desirable for reconstructing and restoring the target voice frame. It may be learned according to the above relevant definitions of the time-domain parameter that the parameters in the parameter set of the target voice frame may include, but are not limited to at least one of a short-term correlation parameter, a long-term correlation parameter, or an energy parameter of the target voice frame. A type of the target voice frame may include, but is not limited to a voiced frame and an unvoiced frame. The voiced frame is a periodic-like signal, and the unvoiced frame is an aperiodic signal. A target voice frame of a different type requires a different parameter for reconstruction. Therefore, a parameter set of the different target voice frame includes a different parameter. After the parameters in the parameter set are determined according to the type of the target voice frame, the correlation between the frequency-domain characteristic of the historical voice frame and the time-domain parameter of the historical voice frame may be analyzed, to obtain the parameter set of the target voice frame. In an implementation, a network model may be invoked to predict the frequency-domain characteristic of the historical voice frame and the time-domain parameter of the historical voice frame, to obtain the parameter set of the target voice frame. The network model may include a plurality of neural networks. A number of the neural networks is determined according to a number of the parameters in the parameter set. A network structure of the network model may be correspondingly configured according to the parameter set of the target voice frame. After the network structure of the network model is configured, the network model may be trained by using a deep learning method to obtain an adjusted network model φ. Then the adjusted network model φ is used to predict the frequency-domain characteristic of the historical voice frame and the time-domain parameter of the historical voice frame. In this way, a parameter set Pa(n) of the target voice frame can be obtained.

S404: Reconstruct the target voice frame according to the parameter set.

The parameter set Pa(n) includes the time-domain parameter of the predicted target voice frame. The time-domain parameter is a parameter reflecting the time-domain characteristic of the time-domain signal. Therefore, the target voice frame can be reconstructed and restored by using the time-domain characteristic of the target voice frame represented by the time-domain parameter of the predicted target voice frame. During specific implementation, inter-parameter filtering may be performed on the parameters in the parameter set Pa(n) to reconstruct the target voice frame.

In this embodiment of the present disclosure, when the target voice frame in the voice signal is desirable to be reconstructed, the parameter set of the target voice frame may be predicted according to the correlation between the frequency-domain characteristic of the historical voice frame corresponding to the target voice frame and the time-domain parameter of the historical voice frame, and then inter-parameter filtering is performed on the parameter set to reconstruct the target voice frame. During the voice reconstruction and restoration, the time and frequency characteristics of the historical voice frame are comprehensively analyzed, and the correlation between the time characteristic and the frequency characteristic of the historical voice frame is used, to reconstruct the target voice frame. The reconstruction process is efficient and is applicable to a communication scenario having a high real-time requirement.

For ease of description, the following exemplary scenario is used as an example for detailed description in the subsequent embodiments of the present disclosure. The example scenario includes the following information: (1) The voice signal is a wideband signal having a sampling rate of Fs=16000 Hz. Based on experience, an LPC filter order corresponding to the wideband signal having the sampling rate Fs=16000 Hz is 16. (2) A frame length of the voice frame is 20 ms, and each voice frame includes 320 samples. (3) The 320 sample points of each voice frame are decomposed into two daughter frames. A first daughter frame corresponds to the first 10 ms of the voice frame, that is, corresponds to 160 sample points in total. A second daughter frame corresponds to the last 10 ms of the voice frame, that is, corresponds to 160 sample points in total. (4) Four subframes of 5 ms are obtained by dividing each voice frame in a unit of 5 ms. Based on experience, a long-term prediction (LTP) filter order corresponding to the subframe of 5 ms is 5. The above exemplary scenario is merely used to describe the process of the voice processing method in this embodiment of the present disclosure more clearly, and does not constitute a limitation on related technologies of this embodiment of the present disclosure. The voice processing method in this embodiment of the present disclosure is also applicable to other scenarios. For example, in other scenarios, Fs may be changed correspondingly. For example, Fs=8000 Hz, 32000 Hz, or 48000 Hz. The voice frame may also be changed correspondingly. For example, the frame length may be 10 ms or 15 ms. Manners of decomposition into daughter frames and subframes may be changed correspondingly. For example, the voice frame may be decomposed into daughter frames in a unit of 5 ms, and the voice frame may be split into subframes in a unit of 5 ms. That is to say, frame lengths of a daughter frame and a subframe are both 5 ms. Similar analysis may be performed for the voice processing in these different scenarios with reference to the voice processing in the exemplary scenario in this embodiment of the present disclosure.

Figure 5:
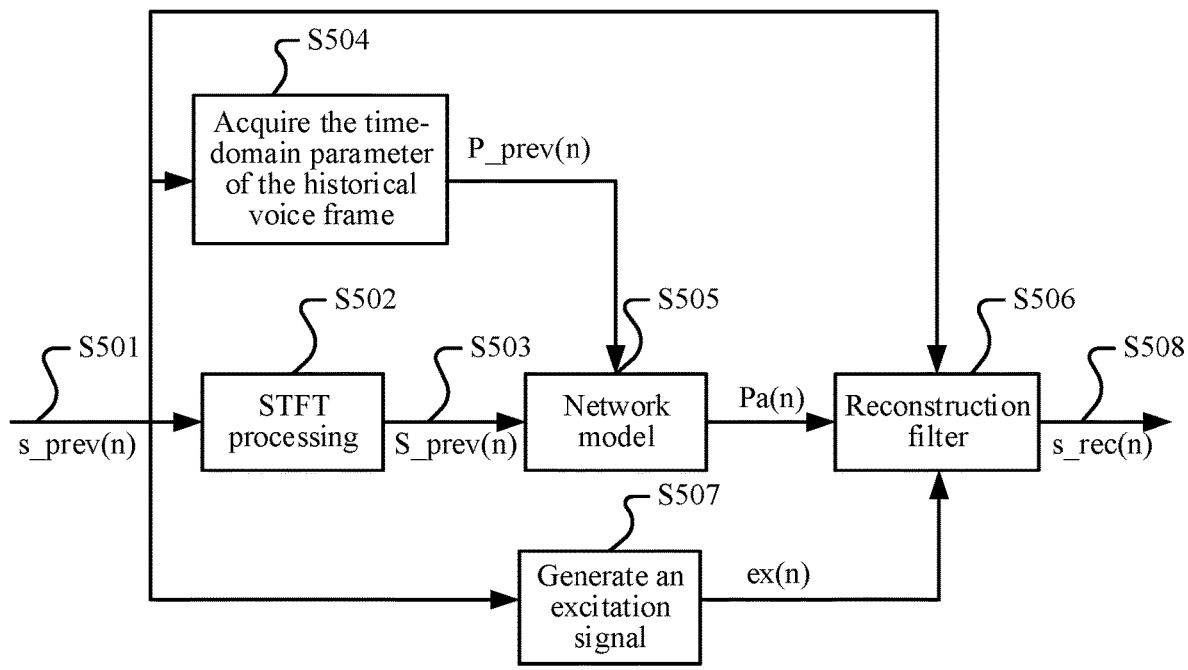
FIG. 5 is a flowchart of a voice processing method according to another exemplary embodiment of the present disclosure.

FIG. 5 is a flowchart of a voice processing method according to another exemplary embodiment of the present disclosure. The method is performed by the receiving terminal shown in FIG. 2A; The receiving terminal is a terminal or a server. The method includes the following steps S501-S508.

S501: Determine a historical voice frame corresponding to a to-be-processed target voice frame.

The target voice frame is an $n^{th}$ voice frame in the voice signal. The historical voice frame includes t voice frames in total: an $(n-t)^{th}$ voice frame to an $(n-1)^{th}$ voice frame in the voice signal. n and t are both positive integers. A value of t may be set according to an actual implementation. In this embodiment, t=5. The historical voice frame is a voice frame transmitted before the target voice frame and can be successfully restored to obtain the voice signal. In an implementation, the historical voice frame is a voice frame received by the receiving terminal and can be normally decoded to restore the voice frame of the voice signal. In another implementation, the historical voice frame is a voice frame that is ever lost but has been successfully reconstructed by the FEC technology, the PLC technology, the voice processing method provided in this embodiment of the present disclosure, or a combination of the above technologies. The successfully reconstructed voice frame can be normally decoded to restore the voice signal. Likewise, after the $n^{th}$ voice frame is successfully reconstructed by using the voice processing method in this embodiment of the present disclosure, if an $(n+1)^{th}$ voice frame is lost and is desirable to be reconstructed, the $n^{th}$ voice frame may be used as a historical voice frame of the $(n+1)^{th}$ voice frame to help reconstruct the $(n+1)^{th}$ voice frame. As shown in FIG. 5, the historical voice frame may be expressed as s_prev(n), which is a sequence composed of sample points included in the $(n-t)^{th}$ voice frame to the $(n-1)^{th}$ voice frame. In the example shown in this embodiment, t=5 is set, and s_prev(n) has 1600 sample points in total.

S502: Perform STFT on the historical voice frame to obtain a frequency-domain coefficient corresponding to the historical voice frame.

S503: Extract an amplitude spectrum from the frequency-domain coefficient corresponding to the historical voice frame as the frequency-domain characteristic of the historical voice frame.

Figure 6:
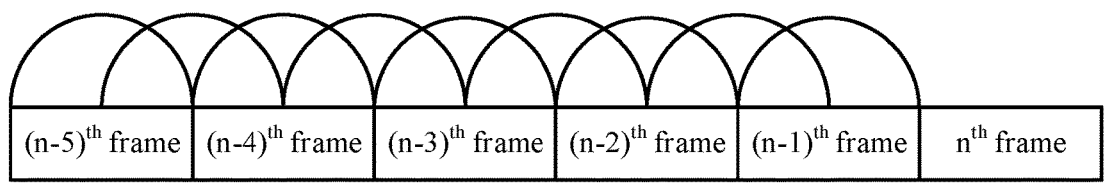
FIG. 6 is a schematic diagram of short-term Fourier transform (STFT) according to an exemplary embodiment of the present disclosure.

In steps S502-S503, by means of the STFT, the historical voice frame in the time-domain can be transformed to a frequency-domain expression. FIG. 6 is a schematic diagram of STFT according to an exemplary embodiment of the present disclosure. In the example shown in FIG. 6, t=5, the STFT adopts an operation of 50% windowing and overlapping, to reduce unsmoothness between frames. After the STFT, the frequency-domain coefficient of the historical voice frame is obtained. The frequency-domain coefficient includes a plurality of sets of STFT coefficients. As shown in FIG. 6, a window function used by the STFT may be a Hanning window. A number of overlapping samples (hop-size) of the window function is 160 points. Therefore, in this embodiment, 9 sets of STFT coefficients can be obtained. Each set of STFT coefficients include 320 sample points. In an implementation, amplitude spectra may be directly extracted from each set of STFT coefficients. The extracted amplitude spectra are formed into an amplitude coefficient sequence and are used as the frequency-domain characteristic S_prev(n) of the historical voice frame.

In another implementation, since the STFT coefficients are symmetrical, that is, a set of STFT coefficients can be evenly divided into two parts, amplitude spectra may be extracted from a part (for example, a previous part) of each set of STFT coefficients. The extracted amplitude spectra are formed into an amplitude coefficient sequence and are used as the frequency-domain characteristic S_prev(n) of the historical voice frame. In the example shown in this embodiment, first 161 sample points are selected from each set of STFT coefficients in the 9 sets of STFT coefficients, and amplitude spectra corresponding to the selected sample points are calculated. 1449 amplitude coefficients are obtained. The 1449 amplitude coefficients form an amplitude coefficient sequence and are used as the frequency-domain characteristic S_prev(n) of the historical voice frame. In order to simplify the calculation complexity, an implementation in which the STFT coefficients are symmetrical is used as an example for description in this embodiment of the present disclosure.

In this embodiment of the present disclosure, the STFT uses a causal system. That is to say, the frequency-domain characteristic analysis is performed based on only the obtained historical voice frame but not a future voice frame (that is, a voice frame transmitted after the target voice frame). In this way, the real-time communication requirement can be satisfied, and the voice processing solution of the present disclosure is applicable to a voice communication scenario having a high real-time requirement.

S504: Acquire the time-domain parameter of the historical voice frame.

As described above, the time-domain parameter is a parameter used to represent the time-domain characteristic of the time-domain signal. The time-domain parameter includes, but is not limited to at least one of a short-term correlation parameter, a long-term correlation parameter, or an energy parameter. Various time-domain parameters are closely correlated with filtering of time-domain signal during the voice processing. A reconstruction filter is involved in this embodiment of the present disclosure. Definitions of the time-domain parameters are described below in combination with a definition of the reconstruction filter. In this embodiment, it is assumed that an $i^{th}$ (i is a positive integer) voice frame is any one of the voice frames in the voice signal. Taking the $i^{th}$ voice frame as an example, the definitions of the various time-domain parameters are as follows:

(1) Short-Term Correlation Parameter

The short-term correlation parameter is a parameter reflecting a short-term correlation characteristic of a time-domain voice signal. A core of the reconstruction filter includes an LPC filter and an LTP filter. The LPC filter is responsible for processing parameters related to the short-term correlation of linear prediction. Therefore, the short-term correlation parameter may be considered as a parameter related to the LPC filter. A p-order filter is first defined, which is shown in formula 1.1:

$$A_p(z)=1+\alpha_1 z^{-1}+\alpha_2 z^{-2}+\ldots+\alpha_p z^{-p} \qquad \text{Formula 1.1}$$

In the above formula 1.1, p is a filter order. For the LPC filter, $\alpha_j$ ($1 \le j \le p$) represents the LPC coefficient. For the LTP filter, $\alpha_j$ ($1 \le j \le p$) represents the LTP coefficient. z represents the voice signal. The LPC filter is implemented based on linear prediction (LP) analysis. The LP analysis means that a filtering result of the $i^{th}$ voice frame is obtained by convolution of first p historical voice frames of the $i^{th}$ voice frame and the p-order filter shown in the above formula 1.1 during LPC filtering of the $i^{th}$ voice frame. This is in line with the short-term correlation characteristic of the voice. Based on experience, in a scenario of sampling rate Fs=8000 Hz, the order of LPC filter p=10. In a scenario of sampling rate Fs=16000 Hz, the order of LPC filter is p=16.

In the example shown in this embodiment, the sampling rate Fs=16000 Hz. In this implementation, the order of the LPC filter may be p=16. The p-order filter shown in the above formula 1.1 may be further decomposed into the following formula 1.2:

$$A_p(z) = \frac{P(z)+Q(z)}{2} \qquad \text{Formula 1.2}$$

$$\text{where } P(z) = A_p(z) - z^{-(p+1)}A_p(z^{-1}) \qquad \text{Formula 1.3}$$

$$Q(z) = A_p(z) + z^{-(p+1)}A_p(z^{-1}). \qquad \text{Formula 1.4}$$

In physical sense, P(z) shown in the formula 1.3 represents a periodic change law of opening of glottis, Q(z) shown in the formula 1.4 represents a periodic change law of closing of glottis, P(z) and Q(z) represents a periodic change law of opening and closing of glottis.

Roots formed by decomposing the two polynomials P(z) and Q(z) alternately appear in a complex plane, and therefore are named as a line spectral frequency (LSF). The LSF is expressed as a series of angular frequencies $w_k$ of the roots of P(z) and Q(z) distributed on a unit circle on the complex plane. Assuming that the roots of P(z) and Q(z) in the complex plane are defined as $\theta_k$, corresponding angular frequencies are defined as the following formula 1.5:

$$w_k = \tan^{-1}\left(\frac{\text{Re}\{\theta_k\}}{\text{Im}\{\theta_k\}}\right). \qquad \text{Formula 1.5}$$

In the above formula 1.5, $\text{Re}\{\theta_k\}$ represents a real number of $\theta_k$, and $\text{Im}\{\theta_k\}$ represents an imaginary number of $\theta_k$.

An LSF (i) of the ith voice frame may be calculated by using the above formula 1.5. It may be learned from the above that, the LSF is a parameter correlated to the short-term correlation of voice. Therefore, the short-term correlation parameter of the ith voice frame includes the LSF (i) of the ith voice frame. During implementation, the voice frame is usually decomposed. That is to say, a voice frame is decomposed into k daughter frames, and the LSF (i) of the ith voice frame is decomposed into the LSFk(i) of the k daughter frames. In the example shown in this embodiment, the voice frame is divided into two daughter frames: a daughter frame of first 10 ms and a daughter frame of last 10 ms. The LSF(i) of the ith voice frame is decomposed into LSF1(i) of the first daughter frame and LSF2(i) of the second daughter frame. In order to further simplify the calculation complexity, in an embodiment, the LSF2(i) of the second daughter frame of the ith voice frame can be obtained by using the above formula 1.5. In this implementation, the LSF1(i) of the first daughter frame of the ith voice frame may be obtained by means of interpolation based on an LSF2(i−1) of a second daughter frame of an (i−1)th frame and the LSF2(i) of the second daughter frame of the ith voice frame. The interpolation factor is expressed as $\alpha_{lsf}(i)$. Therefore, further, the short-term correlation parameter of the ith voice frame may include the LSF2(i) and the interpolation factor $\alpha_{lsf}(i)$ of the second daughter frame of the ith voice frame.

(2) Long-Term Correlation Parameter

The long-term correlation parameter is a parameter reflecting a long-term correlation characteristic of a time-domain voice signal. The LTP filter is responsible for processing parameters related to the long-term correlation of a pitch lag, and therefore the long-term correlation parameter may be considered as a parameter related to the LTP filter. The LTP filter reflects long-term correlation of the voice frame (especially the voiced frame), and the long-term correlation is correlated to the pitch lag of the voice frame. The pitch lag, that is, the pitch lag of the sample point in the ith voice frame reflects periodic-like property of the voice frame. The pitch lag may be obtained by fixing a pitch lag of a sample point in the historical voice frame corresponding to the ith voice frame and then performing LTP filtering on the fixed pitch lag based on the quasi-periodicity. Therefore, the long-term correlation parameter of the ith voice frame includes the pitch lag and the LTP coefficient of each subframe of the ith voice frame.

(3) Energy Parameter

A different voice frame has different energy. The energy may be reflected by a gain value of each subframe of the voice frame. Therefore, the energy parameter of the ith voice frame is the gain value of each subframe in the ith voice frame.

Based on the above definition, in the example shown in this embodiment, t=5. Therefore, the time-domain parameter of the historical voice frame is expressed as P_prev(n). P_prev(n) may include at least one of the following: ① The short-term correlation parameter of the historical voice frame, including the LSF coefficients of the t historical voice frames. In this embodiment, the order of the LPC filter is 16, one daughter frame of each historical voice frame corresponds to 16 LSF coefficients, and each historical voice frame includes two daughter frames. Therefore, each historical voice frame corresponds to 32 LSF coefficients, and P_prev(n) includes 160 LSF coefficients corresponding to the t historical voice frames in total. ② The long-term correlation parameter of the historical voice frame, including a pitch lag and a 5-order LTP filter coefficient of each subframe of 5 ms of the t historical voice frames. Each subframe of each historical voice frame corresponds to one pitch lag and 5 LTP coefficients. Therefore, the long-term correlation parameter of the historical voice frames includes pitch lags of 20 subframes and 100 LTP coefficients in total. ③ The energy parameter of the historical voice frame, including a gain value of each subframe of 5 ms of the t historical voice frames, that is, including 20 subframe gain values in total.

S505: Invoke a network model to predict the frequency-domain characteristic of the historical voice frame and the time-domain parameter of the historical voice frame, to obtain the parameter set of the target voice frame. The parameter set includes at least two parameters, the network model includes a plurality of neural networks, and a number of the neural networks is determined according to a number of types of the parameters in the parameter set.

The parameter set Pa(n) of the target voice frame includes the time-domain parameter of the predicted target voice frame. Based on the above relevant definition of the time-domain parameter, in this embodiment of the present disclosure, the parameter set Pa(n) of the target voice frame may include the following parameters: (1) Short-term correlation parameter of the target voice frame. If the target voice frame includes k daughter frames, the short-term correlation parameter of the target voice frame includes an LSF and an interpolation factor of a kth daughter frame of the target voice frame, k being an integer greater than 1. In the example shown in this embodiment, k=2. That is to say, the target voice frame includes a first daughter frame corresponding to the first 10 ms and a second daughter frame corresponding to the latter 10 ms. Therefore, the parameter set Pa(n) may include a parameter I and a parameter II. The parameter I is an LSF2(n) of the second daughter frame of the target voice frame, and includes 16 LSF coefficients in total. The parameter II is the interpolation factor $\alpha_{lsf}(n)$ of the target voice frame. The interpolation factor $\alpha_{lsf}(n)$ may include 5 candidate values: 0, 0.25, 0.5, 0.75, and 1.0. (2) Long-term correlation parameter of the target voice frame. The target voice frame includes m subframes, the long-term correlation parameter of the target voice frame includes a pitch lag and an LTP coefficient of each subframe of the target voice frame, m being a positive integer. In the example shown in this embodiment, m=4. Therefore, the parameter set Pa(n) may include a parameter III and a parameter IV. The parameter III is the pitch lags of four subframes of the target voice frame, which is expressed as pitch(n,0), pitch(n,1), pitch(n,2), and pitch(n,3). The parameter IV is LTP coefficients corresponding to the four subframes of the target voice frame respectively. Assuming that the LTP filter is a 5-order filter, each subframe corresponds to five LTP coefficients, and parameter IV includes 20 LTP coefficients in total. (3) Energy parameter gain(n) of the target voice frame. A different voice frame has different energy. The energy may be reflected by a gain value of each subframe of the voice frame. Therefore, a parameter V in the parameter set Pa(n) is defined. The parameter V is the energy parameters gain(n) of the target voice frame. In the example shown in this embodiment, the target voice frame includes four subframes of 5 ms, and the energy parameter gain(n) of the target voice frame includes gain values of the four subframes of 5 ms, for example, gain(n,0), gain(n,1), gain (n,2), gain(n,3). Signal amplification is performed by using the gain(n) on the target voice frame reconstructed by filtering by the reconstruction filter. In this way, the reconstructed target voice frame can be amplified to an energy level of an original voice signal, thereby restoring a more accurate and clear target voice frame.

Figure 7:
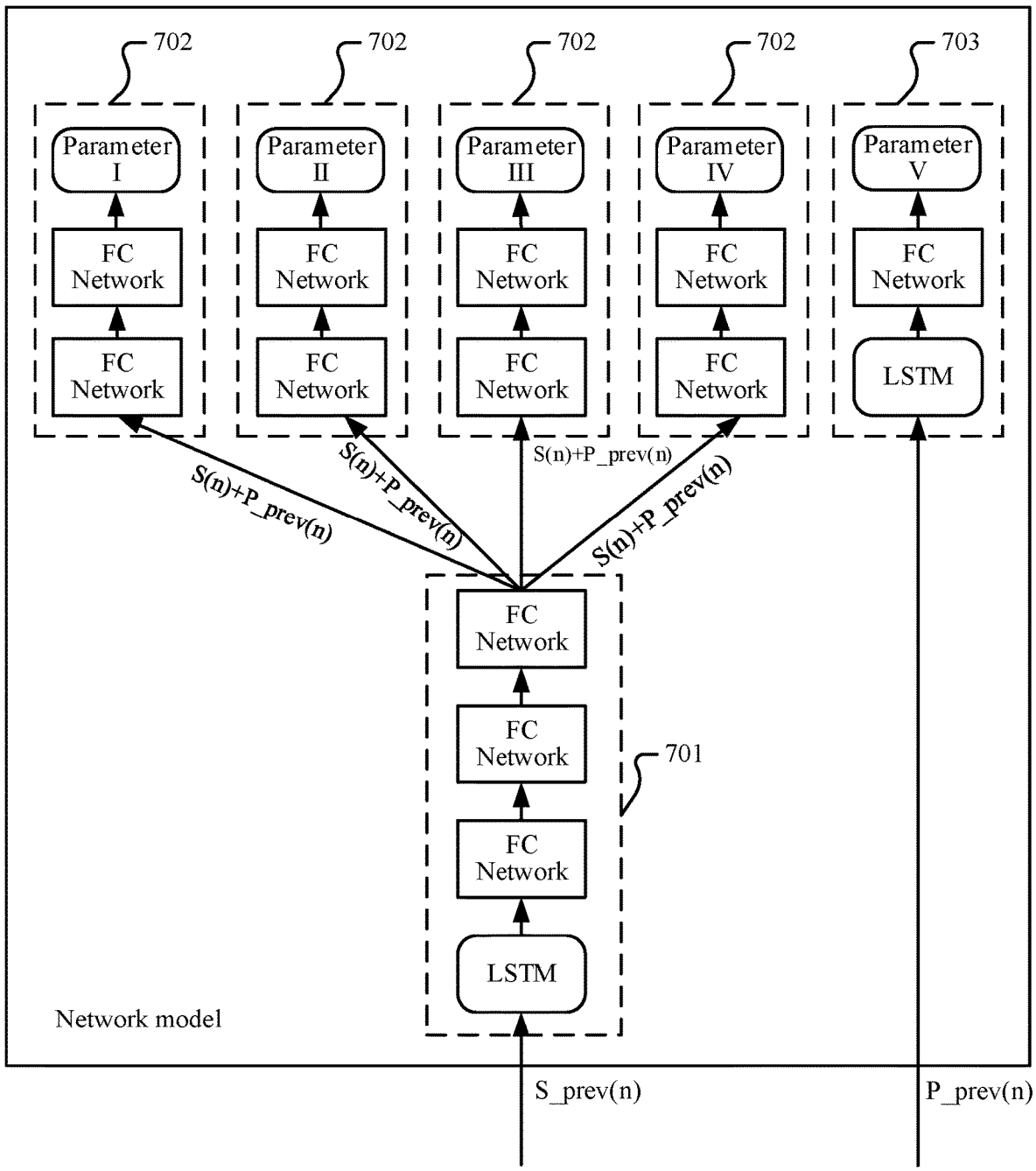
FIG. 7 is a schematic structural diagram of a network model according to an exemplary embodiment of the present disclosure.

Referring to the above step S505, in this embodiment of the present disclosure, the network model is invoked to predict the parameter set Pa(n) of the nth voice frame. Due to the diversity of the parameters, a different network structure is used for a different parameter. That is to say, the network structure of the network model depends on a number of the parameters included in the parameter set Pa(n). In certain embodiment(s), the network model includes a plurality of neural networks, and a number of the neural networks is determined according to the number of the parameters included in the parameter set Pa(n). Based on the various parameters that may be included in the above parameter set Pa(n), FIG. 7 shows a schematic structural diagram of a network model according to an exemplary embodiment of the present disclosure. As shown in FIG. 7, the network model includes a first neural network 701 and a plurality of second neural networks 702. The first neural network 701 is in a cascade relationship with each of the second neural networks 702. That is to say, an output of the first neural network is used as an input of each of the second neural networks 702. Each second neural network 702 is connected to the first neural network 701. A number of the second neural networks 702 corresponds to one parameter in the parameter set. That is to say, one second neural network 702 may be used to predict one parameter in the parameter set Pa(n). It can be learned that the number of the second neural networks is determined according to the number of the parameters in the parameter set. In an implementation, the first neural network 701 includes one long short-term memory (LSTM) and three fully connected (FC) layers. The first neural network 701 is configured to predict a virtual frequency-domain characteristic S(n) (that is, the nth voice frame) of the target voice frame. An input of the first neural network 701 is the frequency-domain characteristic S_prev(n) of the historical voice frame obtained in step S503, and the output is the virtual frequency-domain characteristic S(n) of the target voice frame. In the example shown in this embodiment, S(n) is an amplitude coefficient sequence of virtual 322-dimensional STFT coefficients of the predicted nth voice frame. In the example shown in this embodiment, the LSTM in the first neural network 701 includes one hidden layer and 256 processing units. The first FC layer includes 512 processing units and activation functions. The second FC layer includes 512 processing units and activation functions. The third FC layer includes 322 processing units. The 322 processing units are configured to output the amplitude coefficient sequence of the virtual 322-dimensional STFT coefficient of the target voice frame.

The second neural network 702 is configured to predict the parameters of the target voice frame. The output of the second neural network 702 is configured to reconstruct the parameters of the target voice frame. The input includes the virtual frequency-domain characteristic S(n) of the target voice frame outputted by the first neural network 701 and the time-domain parameter P_prev(n) of the historical voice frame obtained in step S504. Content included in the time-domain parameter P_prev(n) of the historical voice frame inputted by the second neural network 702 may vary with a type of a to-be-predicted parameter or a parameter. Details are as follows: (1) An input of the second neural network 702 configured to predict the parameter I (that is, the LSF coefficient of the target voice frame) in the parameter set of the target voice frame includes the virtual frequency-domain characteristic S(n) of the target voice frame and the time-domain parameter P_prev(n) of the historical voice frame (in this implementation, P_prev(n) includes the LSF coefficients of the t historical voice frames). (2) An input of the second neural network 702 configured to predict the parameter II (that is, the interpolation factor $\alpha_{lsf}(n)$ of the target voice frame) in the parameter set of the target voice frame includes the virtual frequency-domain characteristic S(n) of the target voice frame and the time-domain parameter P_prev(n) of the historical voice frame (in this implementation, P_prev(n) includes the LSF coefficients of the t historical voice frames). (3) An input of the second neural network 702 configured to predict the parameter III (that is, the pitch lags of the four subframes of the target voice frame) in the parameter set of the target voice frame includes the virtual frequency-domain characteristic S(n) of the target voice frame and the time-domain parameter P_prev(n) of the historical voice frame (in this implementation, P_prev(n) includes pitch lags of 20 subframes of the t historical voice frames) in total. (4) An input of the second neural network 702 configured to predict the parameter IV (that is, the 20 LTP coefficients of the target voice frame) in the parameter set of the target voice frame includes the virtual frequency-domain characteristic S(n) of the target voice frame and the time-domain parameter P_prev(n) of the historical voice frame (in this implementation, P_prev(n) includes 100 LTP coefficients of the t historical voice frames) in total.

In the example shown in this embodiment, each second neural network 702 includes two FC layers, and a last FC layer does not include the activation function. Parameters to be predicted by the second neural units 702 are different, and the structures of the FC layers are also different. ① In the two FC layers of the second neural network 702 configured to predict the parameter I, the first FC layer includes 512 processing units and activation functions, and the input of the first FC layer includes the virtual 322-dimensional STFT coefficients of the target voice frame and the total 160 LSF coefficients of the t historical voice frames. The second FC layer includes 16 processing units. The 16 processing units are configured to output the 16 LSF coefficients of the parameter I of the target voice frame. ② In the two FC layers of the second neural network 702 for configured to predict the parameter II, the first FC layer includes 256 processing units and activation functions, and the input of the first FC layer includes the virtual 322-dimensional STFT coefficients of the target voice frame and the total 160 LSF coefficients of the t historical voice frames. The second FC layer includes five processing units. The five processing units are configured to output the five candidate values of the parameter II. ③ In the two FC layers of the second neural network 702 configured to predict the parameter III, the first FC layer includes 256 processing units and activation functions, and the input of the first FC layer includes the virtual 322-dimensional STFT coefficient of the target voice frame and the pitch lags of the total 20 subframes of the t historical voice frames. The second FC layer includes four processing units. The four processing units are configured to output the pitch lags of the four subframes of the parameter III. ④ In the two FC layers of the second neural network 702 configured to predict the parameter IV, the first FC layer includes 512 processing units and activation functions, and the input of the first FC layer includes the virtual 322-dimensional STFT coefficients of the target voice frame and the total 100 LTP coefficients of the t historical voice frames. The second FC layer includes 20 processing units. The 20 processing units are configured to output the 20 LTP coefficients included in the parameter IV.

Based on the network model shown in FIG. 7, in an implementation, step S505 may include the following steps s11, s12, and s14 in detail:

s11: Invoke the first neural network 701 to predict the frequency-domain characteristic S_prev(n) of the historical voice frame, to obtain a virtual frequency-domain characteristic S(n) of the target voice frame.

s12: Input the virtual frequency-domain characteristic S(n) of the target voice frame and the time-domain parameter P_prev(n) of the historical voice frame to the at least two second neural networks 702 respectively as input information for prediction, to obtain the at least two parameters of the target voice frame.

s14: Form the parameter set of the target voice frame by the at least two parameters of the target voice frame.

Referring to FIG. 7 again, the network model further includes a third neural network 703. The third neural network and the first neural network (or the second neural network) are parallel networks. The third neural network 703 includes an LSTM and an FC layer. Based on the network model shown in FIG. 7, in another implementation, the time-domain parameter of the historical voice frame further includes an energy parameter of the historical voice frame. The method further includes the following step s13:

s13: Invoke the third neural network to predict the energy parameter of the historical voice frame, to obtain the energy parameter of the target voice frame, the energy parameter of the target voice frame being a parameter in the parameter set Pa(n) of the target voice frame. The target voice frame includes m subframes, and the energy parameter of the target voice frame includes a gain value of each of the subframes of the target voice frame.

In some embodiments, the parameter set of the target voice frame is formed by the energy parameter of the target voice frame obtained by step s13 and the at least two parameters of the target voice frame obtained by step s12.

The energy parameter of the target voice frame may be predicted by using the energy parameters of some or all of the historical voice frames. In this embodiment, that the energy parameter of the historical voice frame includes an energy parameter of the (n−1)th voice frame and an energy parameter of an (n−2)th voice frame is used as an example for description. The energy parameter of the (n−1)th voice frame is expressed as gain(n−1), and the energy parameter of the (n−2)th voice frame is expressed as gain(n−2). In the example shown in this embodiment, m=4. That is to say, each voice frame includes four subframes of 5 ms. Therefore, the energy parameter gain(n−1) of the (n−1)th voice frame includes the gain values of the four subframes of 5 ms of the (n−1)th voice frame, for example, including gain(n−1,0), gain(n−1,1), gain(n−1,2), and gain(n−1,3). In certain embodiment(s), the energy parameter gain(n−2) of the (n−2)th voice frame includes the gain values of four subframes of 5 ms of the (n−2)th voice frame, for example, including gain(n−2,0), gain (n−2,1), gain(n−2,2), and gain(n−2,3). In certain embodiment(s), the energy parameter gain(n) of the nth voice frame includes the gain values of four subframes of 5 mg of the nth voice frame, including gain(n,0), gain(n, 1), gain(n,2), and gain(n,3). In the example shown in this embodiment, the LSTM in the third neural network includes 128 units. The FC layer includes four processing units and activation functions. The four processing units are respectively configured to output the gain values of the four subframes of the nth voice frame.

Referring to the network structure of the network model shown in FIG. 7, after the parameters in the parameter set Pa(n) are determined according to an actual implementation, the network structure of the network model may be configured correspondingly. For example, if it is determined according to the target voice frame being an unvoiced frame that the parameter set Pa(n) includes only the parameter I, the parameter II, and the parameter V, the network structure of the network model is composed of the first neural network 701, the second neural network 702 configured to predict the parameter I, the second neural network 702 configured to predict the parameter II, and the third neural network 703 for predicting the parameter V. For another example, if it is determined according to the target voice frame being a voiced frame that the parameter set Pa(n) includes the parameters I to V, the network structure of the network model is like that shown in FIG. 7. After the network structure of the network model is configured, the network model may be trained by using the deep learning method to obtain an adjusted network model φ. Then the adjusted network model φ is used to predict the frequency-domain characteristic S_prev(n) of the historical voice frame and the time-domain parameter P_prev(n) of the historical voice frame. Further, the energy parameter of the historical voice frame (such as gain(n−1) and gain(n−2)) may be predicted. In this way, the parameter set Pa(n) of the target voice frame can be obtained.

S506: Establish a reconstruction filter according to the parameter set.

After the parameter set Pa(n) of the target voice frame is obtained, the at least two parameters in the parameter set Pa(n) may be used to establish the reconstruction filter, and the subsequent process of reconstructing the target voice frame is performed. In certain embodiment(s), the reconstruction filter includes the LTP filter and the LPC filter. The LTP filter may be established by using the long-term correlation parameter (including the parameter III and the parameter IV) of the target voice frame, and the LPC filter may be established by using the short-term correlation parameter of the target voice frame. Referring to the above formula 1.1, a key to the establishment of the filter is to determine the corresponding coefficient of the filter. A key to the establishment of the LTP filter is to determine the LTP coefficient. Since the parameter IV includes the LTP coefficient, the LTP filter can be established relatively simply based on the parameter IV.

A key to the establishment of the LPC filter is to determine the LPC coefficient. A process of establishing the LPC coefficient is as follows:

The parameter I is the LSF2(n) of the second daughter frame of the target voice frame, and includes 16 LSF coefficients in total. The parameter II the interpolation factor $\alpha_{lsf}(n)$ of the target voice frame, and may include five candidate values: 0, 0.25, 0.5, 0.75, and 1.0. Therefore, an LSF1(n) of the first daughter frame of the target voice frame can be performed by interpolation. A specific calculation formula is the following formula 1.6:

$$LSF1(n)=(1-\alpha_{LSF}(n)) \cdot LSF2(n-1)+\alpha_{LSF}(n) \cdot LSF2(n) \quad \text{Formula 1.6.}$$

The formula 1.6 indicates that the LSF1(n) of the first daughter frame of the target voice frame is obtained by performing weighted summation on an LSF2(n−1) of the second daughter frame of the (n−1)th voice frame and the LSF2(n) of the second daughter frame of the target voice frame. A weight value is the candidate value of the interpolation factor.

It may be learned by related deduction according to the formulas 1.1-1.5 that the LPC coefficient is correlated with the LSF coefficient. By integrating the formulas 1.1-1.5, a 16-order LPC coefficient, that is, the LPC1(n) of the first daughter frame of the first 10 ms of the target voice frame and a 16-order LPC coefficient, that is, the LPC2(n) of the second daughter frame of the last 10 ms of the target voice frame can be obtained.

By means of the above process, the LPC coefficients can be determined. Therefore, the LPC filter can be established.

S507: Acquire an excitation signal of the target voice frame.

S508: Filter the excitation signal of the target voice frame by using the reconstruction filter, to obtain the target voice frame.

Figure 8:
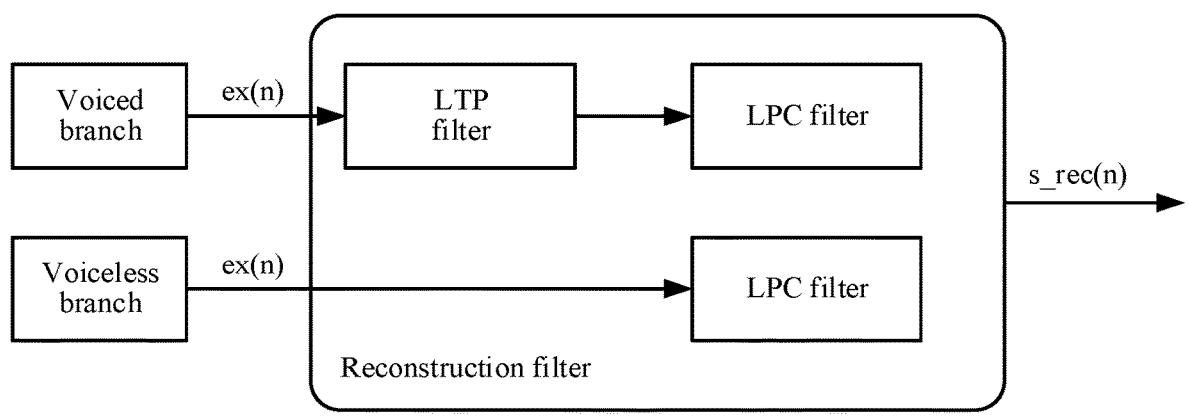
FIG. 8 is a schematic structural diagram of an excitation signal-based voice generating model according to an exemplary embodiment of the present disclosure.

FIG. 8 is a schematic structural diagram of an excitation signal-based voice generating model according to an exemplary embodiment of the present disclosure. A physical basis of an excitation signal-based voice generation model is a human sound generation process. The human sound generation process may be roughly split into two sub-processes. (1) When a person vocalizes, a noise-like shock signal with certain energy is generated at the trachea of the person. The shock signal corresponds to the excitation signal. The excitation signal is a set of random signed noise-like sequences having a fault-tolerant capability. (2) The shock signal shocks the vocal cord of the person to generate periodic-like opening and closing. After amplification by the oral cavity, a sound is generated. The process corresponds to the reconstruction filter. A working mechanism of the reconstruction filter is to simulate the process to generate a sound. The sound is classified into an unvoiced sound and a voiced sound. The voiced sound is a sound with vibration of the vocal cord. The unvoiced sound is a sound generated without vibration of the vocal cord. In view of the above characteristics of the sound, the human sound generation is further detailed. (3) For a periodic-like signal such as the voiced sound, the LTP filter and the LPC filter are desirable to be used during the reconstruction, and the excitation signal shocks the LTP filter and LPC filter. (4) For an aperiodic signal such as the unvoiced sound, only the LPC filter is desirable to be used during the reconstruction, and the excitation signal shocks only the LPC filter.

It may be learned from the description that the excitation signal is a set of random signed noise-like sequences, and is used as a driving source to shock (or excite) the reconstruction filter to generate the target voice frame. In step S507 in this embodiment of the present disclosure, the excitation signal of the historical voice frame may be acquired, and the excitation signal of the target voice frame may be determined according to the excitation signal of the historical voice frame.

In an implementation, in step S507, the excitation signal of the target voice frame may be determined by multiplexing. The multiplexing may be shown by the following formula 1.7:

$$ex(n)=ex(n-1) \qquad \text{Formula 1.7.}$$

In the above formula 1.7, $ex(n-1)$ represents the excitation signal of the $(n-1)$th voice frame. $ex(n)$ represents the excitation signal of the target voice frame (that is, the nth voice frame).

In another implementation, in step S507, the excitation signal of the target voice frame may be determined by averaging. The averaging may be expressed by the following formula 1.8:

$$ex(n) = \frac{\sum_{q=1}^{T} ex(n-q)}{t}. \qquad \text{Formula 1.8}$$

The formula 1.8 means averaging the excitation signals of the t historical voice frames from the $(n-t)$th voice frame to the $(n-1)$th voice frame to obtain the excitation signal $ex(n)$ of the target voice frame (that is, the nth voice frame). In the formula 1.8, $ex(n-q)(1 \le q \le t)$ represents the excitation signals of the voice frames from the $(n-t)$th voice frame to the $(n-1)$th voice frame.

In another implementation, in step S507, the excitation signal of the target voice frame may be determined by weighted summation. The weighted summation may be shown by the following formula 1.9:

$$ex(n)=\Sigma_{q=1}^{t}\alpha_q \cdot ex(n-q) \qquad \text{Formula 1.9.}$$

The formula 1.9 means performing weighted summation on the excitation signals of the t historical voice frames from the $(n-t)$th voice frame to the $(n-1)$th voice frame, to obtain the excitation signal $ex(n)$ of the target voice frame (that is, the nth voice frame). In the formula 1.9, $\alpha_q$ represents a weight value corresponding to the excitation signal of each voice frame. For example, t=5. A combination of the weight values may be like that shown in the following Table 1:

TABLE 1

| Item | Weight value |
|---|---|
| $\alpha_1$ | 0.40 |
| $\alpha_2$ | 0.30 |
| $\alpha_3$ | 0.15 |
| $\alpha_4$ | 0.10 |
| $\alpha_5$ | 0.05 |

As an example, the weight values corresponding to the excitation signals of the voice frames in formula 1.9 are not the same.

Referring to FIG. 8, in an implementation, when in response to determining that the target voice frame is an aperiodic signal such as the unvoiced frame, the reconstruction filter may include only the LPC filter. That is to say, the excitation signal of the target voice frame is filtered by using only the LPC filter. In this implementation, the parameter set Pa(n) may include the parameter I, the parameter II, and the parameter V. Therefore, the process of generating the target voice frame in step S508 is processing of the LPC filtering stage. The process includes the following:

The parameter I is the LSF2(n) of the second daughter frame of the target voice frame, and includes 16 LSF coefficients in total. The parameter II the interpolation factor $\alpha_{lsf}(n)$ of the target voice frame, and may include five candidate values: 0, 0.25, 0.5, 0.75, and 1.0. The LSF1(n) of the first daughter frame of the target voice frame is calculated by using the above formula 1.6.

It may be learned by related deduction according to the formulas 1.1-1.5 that the LPC coefficient is correlated with the LSF coefficient. By integrating the formulas 1.1-1.5, a 16-order LPC coefficient, that is, the LPC1(n) of the first daughter frame of the first 10 ms of the target voice frame and a 16-order LPC coefficient, that is, the LPC2(n) of the second daughter frame of the last 10 ms of the target voice frame can be obtained.

Under the shock of the excitation signal of the target voice frame, LPC filtering is performed on the LPC1(n) to reconstruct the 160 sample points of the first 10 ms of the target voice frame, and gain(n,0) and gain(n,1) are invoked to amplify the first 160 sample points to obtain the first 160 sample points of the reconstructed target voice frame. In certain embodiment(s), LPC filtering is performed on the LPC2(n) to reconstruct the 160 sample points of the last 10 ms of the target voice frame, and gain(n,2) and gain(n,3) are invoked to amplify the last 160 sample points to obtain the last 160 sample points of the reconstructed target voice frame. The first 10 ms and the last 10 ms of the target voice frame are synthesized to obtain the target voice frame.

During the LPC filtering, the LSF coefficient of the $(n-1)$th voice frame is used for the LPC filtering of the nth voice frame. In other words, the LPC filtering of the nth voice frame is desirable to be implemented by using the historical voice frame adjacent to the nth voice frame, which confirms the short-term correlation characteristic of the LPC filtering.

In another implementation, when in response to determining that the target voice frame is a periodic-like signal such as the voiced frame, the reconstruction filter includes the LPC filter and the LTP filter. That is to say, the excitation signal of the target voice frame is desirable to be filtered by using both the LTP filter and the LPC filter. In this implementation, the parameter set Pa(n) may include the parameter I, the parameter II, the parameter III, the parameter IV, and the parameter V. Therefore, the process of generating the target voice frame in step S508 includes the following:

(1) LTP Filtering Stage:

The parameter III includes the pitch lags of the four subframes: pitch(n,0), pitch(n,1), pitch(n,2), and pitch(n,3). A pitch lag of each subframe is processed as follows: ① The pitch lag of the subframe is compared with a preset threshold. If the pitch lag of the subframe is lower than the preset threshold, the pitch lag of the subframe is set to 0, and the LTP filtering step is omitted. ② If the pitch lag of the subframe is not lower than the preset threshold, a historical sample point corresponding to the subframe is extracted. Assuming that the order of the LTP filter is 5, the 5-order LTP filter is invoked to perform LTP filtering on the historical sample point corresponding to the subframe, and an LTP filtering result of the subframe is obtained. Since the LTP filtering reflects the long-term correlation of the voice frame, and the long-term correlation is correlated with the pitch lag, during the LTP filtering in the above step ②, the historical sample point corresponding to the subframe is selected with reference to the pitch lag of the subframe. In certain embodiment(s), the subframe is used as a starting point, and sample points of a number corresponding to a value of the pitch lag are traced as the historical sample point corresponding to the subframe. For example, if the value of the pitch lag of the subframe is 100, the historical sample point corresponding to the subframe includes 100 sample points traced back by using the subframe as a starting point. It can be learned that setting the historical sample point corresponding to the subframe with reference to the pitch lag of the subframe actually means using the sample points included in the historical subframe (such as the subframe of the last 5 ms) before the subframe for LTP filtering, which confirms the long-term correlation characteristic of LTP filtering.

Then the LTP filtering results of subframes are synthesized. In certain embodiment(s), the LTP filtering result of the first subframe and the LTP filtering result of the second subframe are synthesized, to obtain an LTP synthesis signal of the first daughter frame of the first 10 ms of the target voice frame. The LTP filtering result of the third subframe and the LTP filtering result of the fourth subframe are synthesized to obtain an LTP synthesis signal of the second daughter frame of the last 10 ms of the target voice frame. So far, the processing of the LTP filtering stage is performed.

(2) LPC Filtering Stage:

Referring to the processing of the LPC filtering stage in the above implementation, the 16-order LPC coefficient, that is, the LPC1(n) of the first daughter frame of the first 10 ms of the target voice frame is obtained, and the 16-order LPC coefficient, that is, the LPC2(n) of the second daughter frame of the last 10 ms of the target voice frame are obtained, based on the parameter I and the parameter II.

Then LPC filtering is performed on the LTP synthesis signal of the first daughter frame of the first 10 ms of the target voice frame obtained in the LTP filtering stage and LPC1(n), to reconstruct 160 sample points of the first 10 ms of the target voice frame, and gain(n,0) and gain(n,1) are invoked to amplify the first 160 sample points to obtain the first 160 sample points of the reconstructed target voice frame. In certain embodiment(s), LPC filtering is performed on the LTP synthesis signal of the second daughter frame of the last 10 ms of the target voice frame obtained in the LTP filtering stage and the LPC2(n), to reconstruct 160 sample points of the last 10 ms of the target voice frame, and gain(n,2) and gain(n,3) are invoked to amplify the last 160 sample points to obtain the last 160 sample points of the reconstructed target voice frame. The first 10 ms and the last 10 ms of the target voice frame are synthesized to obtain a target voice frame.

According to the above description of this embodiment, when the PLC is desirable to be performed on the nth voice frame in the voice signal, the nth voice frame can be reconstructed based on the voice processing method in this embodiment. When in response to determining that continuous packet loss occurs, for example, the (n+1)th voice frame and the (n+2)th voice frame are both lost, reconstruction and restoration of the (n+1)th voice frame, the (n+2)th voice frame, and the like may be performed according to the process, so as to implement the continuous PLC and ensure the quality of voice communication.

In this embodiment of the present disclosure, when in response to determining that the target voice frame in the voice signal may be reconstructed, the network model may be invoked to predict the frequency-domain characteristic and the time-domain parameter of the historical voice frame corresponding to the target voice frame to obtain the parameter set of the target voice frame, and then inter-parameter filtering is performed on the parameter set to reconstruct the target voice frame. The voice reconstruction and restoration process combines the signal analysis technology with the deep learning technology, which makes up for the shortcomings of traditional signal analysis technology and improves the voice processing capability. Moreover, deep learning is performed on the historical voice frame to predict the parameter set of the target voice frame, so as to reconstruct the target voice frame according to the parameter set of the target voice frame. The reconstruction process is relatively simple and efficient, and is applicable to a communication scenario having a high real-time requirement. Further, the parameter set used to reconstruct the target voice frame includes two or more parameters, so that the learning target of the network model is decomposed into a plurality of parameters. Each parameter corresponds to a different neural network for learning. A different neural network may be flexibly configured and combined according to a different parameter set to form a structure of the network model. In this way, the network structure can be greatly simplified, and the processing complexity can be effectively reduced. Continuous PLC is supported. That is to say, when a plurality of consecutive frames are lost, the plurality of consecutive frames can be reconstructed to ensure the quality of voice communication.

Figure 9:
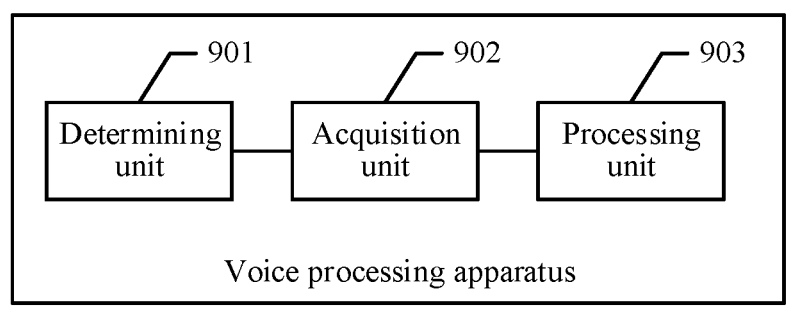
FIG. 9 is a schematic structural diagram of a voice processing apparatus according to an exemplary embodiment of the present disclosure.

FIG. 9 is a schematic structural diagram of a voice processing apparatus according to an exemplary embodiment of the present disclosure. The voice processing apparatus may be configured as a computer program (including program code) running in a terminal. For example, the voice processing apparatus may be an application program in the terminal (such as an App that provides a VoIP communication function). The terminal running the voice processing apparatus may be used as the receiving terminal shown in FIG. 1 or FIG. 2A. The voice processing apparatus may be configured to perform some or all of the steps in the method embodiments shown in FIG. 4 and FIG. 5. Referring to FIG. 9, the voice processing apparatus includes the following units: a determining unit 901, configured to determine a historical voice frame corresponding to a to-be-processed target voice frame; an acquisition unit 902, configured to acquire a frequency-domain characteristic of the historical voice frame and a time-domain parameter of the historical voice frame; and a processing unit 903, configured to predict a parameter set of the target voice frame according to a correlation between the frequency-domain characteristic of the historical voice frame and the time-domain parameter of the historical voice frame, the parameter set including at least two parameters; and reconstruct the target voice frame according to the parameter set.

In an implementation, the processing unit 903 is configured to: establish a reconstruction filter according to the parameter set; acquire an excitation signal of the target voice frame; and filter the excitation signal of the target voice frame by using the reconstruction filter to obtain the target voice frame.

In an implementation, the processing unit 903 is configured to: acquire an excitation signal of the historical voice frame; and determine the excitation signal of the target voice frame according to the excitation signal of the historical voice frame.

In an implementation, the target voice frame is an nth voice frame in the voice signal transmitted by the VoIP system. The historical voice frame includes t voice frames from an (n−t)th voice frame to an (n−1)th voice frame in the voice signal transmitted by the VoIP system. n and t are both positive integers.

In an implementation, the excitation signal of the historical voice frame includes an excitation signal of the (n−1)th voice frame. The processing unit 903 is configured to: determine the excitation signal of the (n−1)th voice frame as the excitation signal of the target voice frame.

In an implementation, the excitation signal of the historical voice frame includes excitation signals of voice frames from the (n−t)th voice frame to the (n−1)th voice frame. The processing unit 903 is configured to average the excitation signals of the total t voice frames from the (n−t)th voice frame to the (n−1)th voice frame to obtain the excitation signal of the target voice frame.

In an implementation, the excitation signal of the historical voice frame includes excitation signals of voice frames from the (n−t)th voice frame to the (n−1)th voice frame. The processing unit 903 is configured to perform weighted summation on the excitation signals of the total t voice frames from the (n−t)th voice frame to the (n−1)th voice frame to obtain the excitation signal of the target voice frame.

In an implementation, the processing unit 903 is configured to:

invoke a network model to predict the frequency-domain characteristic of the historical voice frame and the time-domain parameter of the historical voice frame, to obtain the parameter set of the target voice frame. The parameter set includes at least two parameters, the network model includes a plurality of neural networks, and a number of the neural networks is determined according to a number of the parameters in the parameter set.

In an implementation, the network model includes a first neural network and at least two second neural networks. A first neural network 701 is in a cascade relationship with each of second neural networks 702. One of the second neural networks corresponds to a parameter in the parameter set. The processing unit 903 is configured to: invoke the first neural network to predict the frequency-domain characteristic of the historical voice frame, to obtain a virtual frequency-domain characteristic of the target voice frame; and input the virtual frequency-domain characteristic of the target voice frame and the time-domain parameter of the historical voice frame to the at least two second neural networks respectively as input information for prediction, to obtain the at least two parameters in the parameter set of the target voice frame.

In an implementation, the acquisition unit 902 is configured to: perform STFT on the historical voice frame to obtain a frequency-domain coefficient corresponding to the historical voice frame; and extract an amplitude spectrum from the frequency-domain coefficient corresponding to the historical voice frame as the frequency-domain characteristic of the historical voice frame.

In an implementation, when in response to determining that the target voice frame is an unvoiced frame, the time-domain parameter of the historical voice frame includes a short-term correlation parameter of the historical voice frame, and the parameter set includes a short-term correlation parameter of the target voice frame; and the reconstruction filter includes an LPC filter.

The target voice frame includes k daughter frames, and the short-term correlation parameter of the target voice frame includes an LSF and an interpolation factor of a kth daughter frame of the target voice frame, k being an integer greater than 1.

In an implementation, when in response to determining that the target voice frame is a voiced frame, the time-domain parameter of the historical voice frame includes a short-term correlation parameter and a long-term correlation parameter of the historical voice frame, and the parameter set includes a short-term correlation parameter of the target voice frame and a long-term correlation parameter of the target voice frame; and the reconstruction filter includes an LTP filter and an LPC filter.

The target voice frame includes k daughter frames, and the short-term correlation parameter of the target voice frame includes an LSF and an interpolation factor of a kth daughter frame of the target voice frame, k being an integer greater than 1.

The target voice frame includes m subframes, and the long-term correlation parameter of the target voice frame includes a pitch lag and an LTP coefficient of each subframe of the target voice frame, m being a positive integer.

In an implementation, the network model further includes a third neural network.

The network model includes a first neural network, at least two second neural networks, and a third neural network. A network formed by the first neural network, each of the second neural networks, and the third neural network is a parallel network. The time-domain parameter of the historical voice frame includes an energy parameter of the historical voice frame.

The processing unit 903 is configured to: invoke the first neural network to predict the frequency-domain characteristic of the historical voice frame, to obtain a virtual frequency-domain characteristic of the target voice frame; input the virtual frequency-domain characteristic of the target voice frame and the energy parameter of the historical voice frame to the at least two second neural networks respectively as input information for prediction, to obtain the at least two parameters of the target voice frame; invoke the third neural network to predict the energy parameter of the historical voice frame, to obtain the energy parameter of the target voice frame; and form the parameter set of the target voice frame by the at least two parameters of the target voice frame and the energy parameter of the target voice frame. The target voice frame includes m subframes, and the energy parameter of the target voice frame includes a gain value of each of the subframes of the target voice frame.

In this embodiment of the present disclosure, when in response to determining that the target voice frame in the voice signal may be reconstructed, the network model may be invoked to predict the frequency-domain characteristic and the time-domain parameter of the historical voice frame corresponding to the target voice frame to obtain the parameter set of the target voice frame, and then inter-parameter filtering is performed on the parameter set to reconstruct the target voice frame. The voice reconstruction and restoration process combines the signal analysis technology with the deep learning technology, which makes up for the shortcomings of traditional signal analysis technology and improves the voice processing capability. Moreover, deep learning is performed on the historical voice frame to predict the parameter set of the target voice frame, so as to reconstruct the target voice frame according to the parameter set of the target voice frame. The reconstruction process is relatively simple and efficient, and is applicable to a communication scenario having a high real-time requirement. Further, the parameter set used to reconstruct the target voice frame includes two or more parameters, so that the learning target of the network model is decomposed into a plurality of parameters. Each parameter corresponds to a different neural network for learning. A different neural network may be flexibly configured and combined according to a different parameter set to form a structure of the network model. In this way, the network structure can be greatly simplified, and the processing complexity can be effectively reduced. Continuous PLC is supported. That is to say, when a plurality of consecutive frames are lost, the plurality of consecutive frames can be reconstructed to ensure the quality of voice communication.

Figure 10:
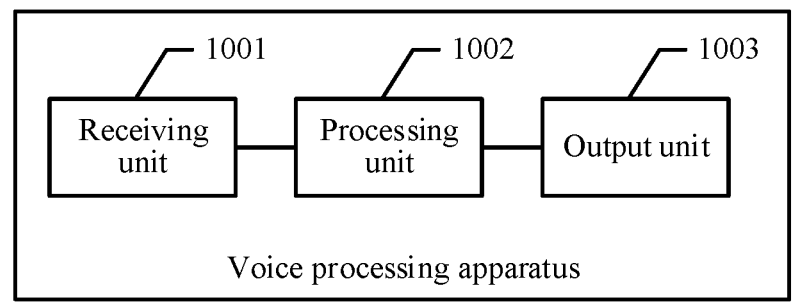
FIG. 10 is a schematic structural diagram of a voice processing apparatus according to another exemplary embodiment of the present disclosure.

FIG. 10 is a schematic structural diagram of a voice processing apparatus according to another exemplary embodiment of the present disclosure. The voice processing apparatus may be configured as a computer program (including program code) running in a terminal. For example, the voice processing apparatus may be an application program in the terminal (such as an App that provides a VoIP communication function). The terminal running the voice processing apparatus may be used as the terminal on the receiving side shown in FIG. 1 or FIG. 2A. The voice processing apparatus may be configured to perform some or all of the steps in the method embodiment shown in FIG. 3. Referring to FIG. 10, the voice processing apparatus includes the following units: a receiving unit 1001, configured to receive a voice signal transmitted by a VoIP system; a processing unit 1002, configured to reconstruct the target voice frame by using the method shown in FIG. 4 or FIG. 5 when in response to determining that the target voice frame in the voice signal is lost; and an output unit 1003, configured to output the voice signal based on the reconstructed target voice frame.

In an implementation, the processing unit 1002 is further configured to: acquire redundant information of the target voice frame; reconstruct the target voice frame according to the redundant information of the target voice frame when in response to determining that the target voice frame in the voice signal is lost; and reconstruct the target voice frame by using the method shown in FIG. 4 or FIG. 5 when in response to determining that the reconstruction of the target voice frame according to the redundant information of the target voice frame fails.

In this embodiment of the present disclosure, when the target voice frame in the VoIP voice signal is lost, the voice processing method may be used to reconstruct the target voice frame. The reconstruction process by using the voice processing method is relatively simple and efficient, and is applicable to a communication scenario having a high real-time requirement. In addition, PLC is supported. That is to say, when a plurality of consecutive frames are lost, the plurality of consecutive frames can be reconstructed to ensure the quality of voice communication. Moreover, the voice processing method may be used in combination with the FEC technology. Flexible combinations are provided to avoid the adverse effect caused by the impairment of sound quality.

Figure 11:
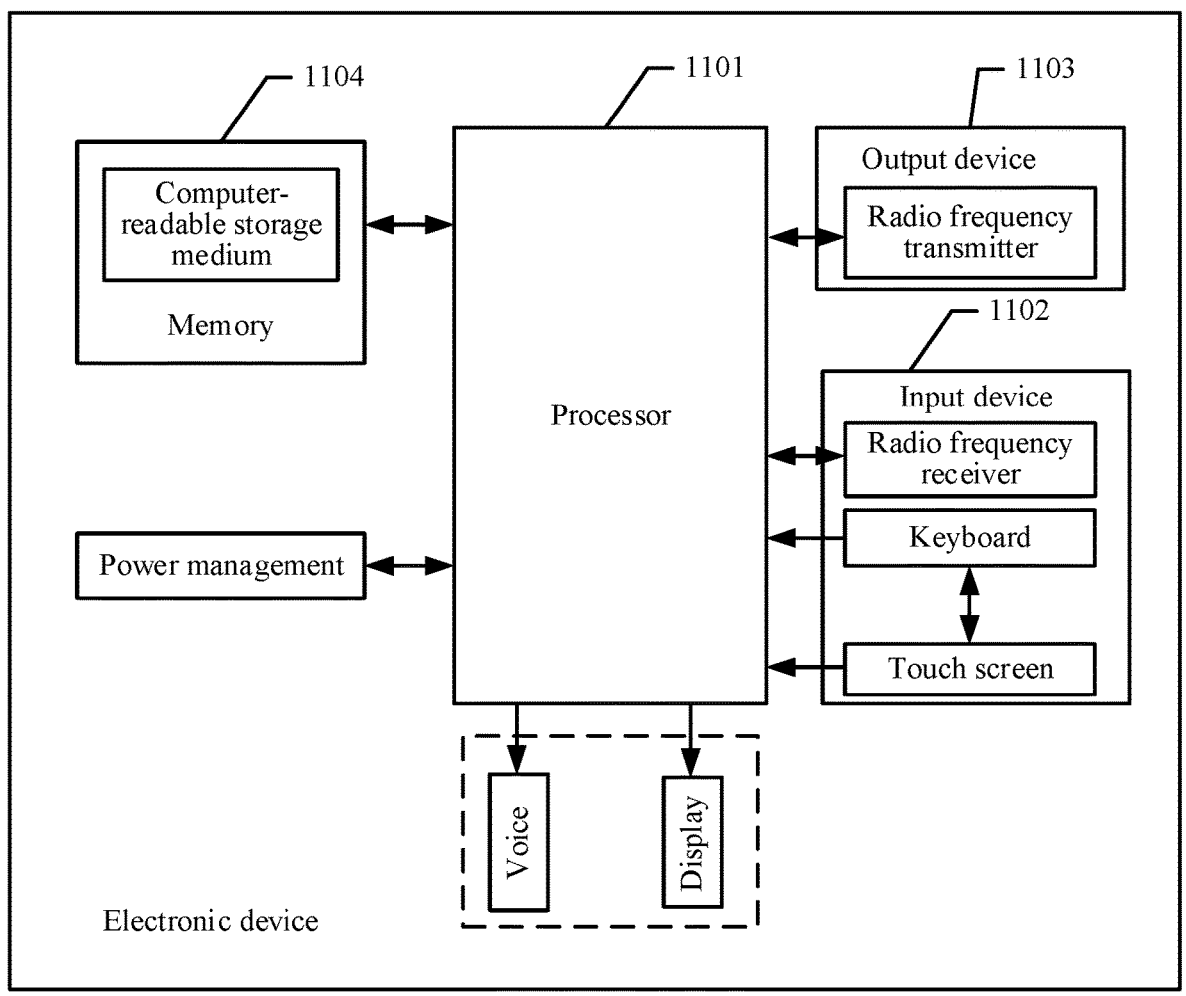
FIG. 11 is a schematic structural diagram of an electronic device according to an exemplary embodiment of the present disclosure.

FIG. 11 is a schematic structural diagram of an electronic device according to an exemplary embodiment of the present disclosure. Referring to FIG. 11, the electronic device may be the terminal on the receiving side shown in FIG. 1 or FIG. 2A. The electronic device includes a processor 1101, an input device 1102, an output device 1103, and a computer-readable storage medium 1104. The processor 1101, the input device 1102, the output device 1103, and the computer-readable storage medium 1104 may be connected by a bus or in other manners. The computer-readable storage medium 1104 may be stored in a memory of the electronic device. The computer-readable storage medium 1104 is configured to store a computer program. The computer program includes program instructions. The processor 111 is configured to execute the program instructions stored in the computer-readable storage medium 1104. The processor 1101 (or referred to as a central processing unit (CPU)) is a computing core and a control core of the electronic device, is suitable for implementing one or more instructions, and is suitable for loading and executing one or more instructions to implement a corresponding method procedure or a corresponding function.

The embodiments of the present disclosure further provide a computer-readable storage medium, and the computer-readable storage medium is a memory device in an electronic device and is configured to store programs and data. It may be understood that the computer-readable storage medium herein may include an internal storage medium of the electronic device and may also include an extended storage medium supported by the electronic device. The computer-readable storage medium provides storage space, and the storage space stores an operating system of the electronic device. In addition, the storage space further stores one or more instructions suitable for being loaded and executed by the processor 1101. The instructions may be one or more computer programs (including program code). The computer-readable storage medium herein may be a high-speed RAM memory, or may be a non-volatile memory, such as at least one magnetic disk storage. In certain embodiment(s), the computer-readable storage medium may be at least one computer-readable note storage medium far away from the processor.

In an embodiment, one or more instructions are stored in the computer-readable storage medium. The one or more instructions stored in the computer-readable storage medium are loaded and executed by the processor 1101 to realize the corresponding steps of the voice processing method in the embodiment shown in FIG. 4 or FIG. 5. During specific implementation, the one or more instructions in the computer-readable storage medium are loaded and executed by the processor 1101 to perform the following steps: determining a historical voice frame corresponding to a to-be-processed target voice frame; acquiring a frequency-domain characteristic of the historical voice frame and a time-domain parameter of the historical voice frame; predicting a parameter set of the target voice frame according to a correlation between the frequency-domain characteristic of the historical voice frame and the time-domain parameter of the historical voice frame, the parameter set including at least two parameters; and reconstructing the target voice frame according to the parameter set.

In an implementation, when the one or more instructions in the computer-readable storage medium are loaded and execute by the processor 1101 to perform the step of reconstructing the target voice frame according to the parameter set, the following specific steps are performed: establishing a reconstruction filter according to the parameter set; acquiring an excitation signal of the target voice frame; and filtering the excitation signal of the target voice frame by using the reconstruction filter to obtain the target voice frame.

In an implementation, when the one or more instructions in the computer-readable storage medium are loaded and executed by the processor 1101 to perform the step of acquiring the excitation signal of the target voice frame, the following specific steps are performed: acquiring an excitation signal of the historical voice frame; and determining the excitation signal of the target voice frame according to the excitation signal of the historical voice frame.

In an implementation, the target voice frame is an nth voice frame in the voice signal transmitted by the VoIP system. The historical voice frame includes t voice frames from an (n−t)th voice frame to an (n−1)th voice frame in the voice signal transmitted by the VoIP system. n and t are both positive integers.

In an implementation, the excitation signal of the historical voice frame includes an excitation signal of the (n−1)th voice frame. When the one or more instructions in the computer-readable storage medium are loaded and executed by the processor 1101 to perform the step of determining the excitation signal of the target voice frame according to the excitation signal of the historical voice frame, the following specific step is performed: determining the excitation signal of the (n−1)th voice frame as the excitation signal of the target voice frame.

In an implementation, the excitation signal of the historical voice frame includes excitation signals of voice frames from the (n−t)th voice frame to the (n−1)th voice frame. When the one or more instructions in the computer-readable storage medium are loaded and executed by the processor 1101 to perform the step of determining the excitation signal of the target voice frame according to the excitation signal of the historical voice frame, the following specific step is performed: averaging the excitation signals of the total t voice frames from the (n−t)th voice frame to the (n−1)th voice frame to obtain the excitation signal of the target voice frame.

In an implementation, the excitation signal of the historical voice frame includes excitation signals of voice frames from the (n−t)th voice frame to the (n−1)th voice frame. When the one or more instructions in the computer-readable storage medium are loaded and executed by the processor 1101 to perform the step of determining the excitation signal of the target voice frame according to the excitation signal of the historical voice frame, the following specific step is performed: performing weighted summation on the excitation signals of the total t voice frames from the (n−t)th voice frame to the (n−1)th voice frame to obtain the excitation signal of the target voice frame.

In an implementation, when the one or more instructions in the computer-readable storage medium are loaded and execute by the processor 1101 to perform the step of predicting the parameter set of the target voice frame according to the correlation between the frequency-domain characteristic of the historical voice frame and the time-domain parameter of the historical voice frame, the following specific step is performed:

invoking a network model to predict the frequency-domain characteristic of the historical voice frame and the time-domain parameter of the historical voice frame, to obtain the parameter set of the target voice frame. The parameter set includes at least two parameters, the network model includes a plurality of neural networks, and a number of the neural networks is determined according to a number of the parameters in the parameter set.

In an implementation, the network model includes a first neural network and at least two second neural networks. A first neural network 701 is in a cascade relationship with each of second neural networks 702. One of the second neural networks corresponds to a parameter in the parameter set. When the one or more instructions in the computer-readable storage medium are loaded and executed by the processor 1101 to invoke the network model to predict the frequency-domain characteristic of the historical voice frame and the time-domain parameter of the historical voice frame, to obtain the parameter set of the target voice frame, the following specific steps are performed: invoking the first neural network to predict the frequency-domain characteristic of the historical voice frame, to obtain a virtual frequency-domain characteristic of the target voice frame; and inputting the virtual frequency-domain characteristic of the target voice frame and the time-domain parameter of the historical voice frame to the at least two second neural networks respectively as input information for prediction, to obtain the at least two parameters in the parameter set of the target voice frame.

In an implementation, when the one or more instructions in the computer-readable storage medium are loaded and executed by the processor 1101 to perform the step of acquiring the frequency-domain characteristic of the historical voice frame, the following specific steps are performed: performing STFT on the historical voice frame to obtain a frequency-domain coefficient corresponding to the historical voice frame; and extracting an amplitude spectrum from the frequency-domain coefficient corresponding to the historical voice frame as the frequency-domain characteristic of the historical voice frame.

In an implementation, when in response to determining that the target voice frame is an unvoiced frame, the time-domain parameter of the historical voice frame includes a short-term correlation parameter of the historical voice frame, and the parameter set includes a short-term correlation parameter of the target voice frame; and the reconstruction filter includes an LPC filter.

The target voice frame includes k daughter frames, and the short-term correlation parameter of the target voice frame includes an LSF and an interpolation factor of a kth daughter frame of the target voice frame, k being an integer greater than 1.

In an implementation, when in response to determining that the target voice frame is a voiced frame, the time-domain parameter of the historical voice frame includes a short-term correlation parameter and a long-term correlation parameter of the historical voice frame, and the parameter set includes a short-term correlation parameter of the target voice frame and a long-term correlation parameter of the target voice frame; and the reconstruction filter includes an LTP filter and an LPC filter.

The target voice frame includes k daughter frames, and the short-term correlation parameter of the target voice frame includes an LSF and an interpolation factor of a kth daughter frame of the target voice frame, k being an integer greater than 1.

The target voice frame includes m subframes, and the long-term correlation parameter of the target voice frame includes a pitch lag and an LTP coefficient of each subframe of the target voice frame, m being a positive integer.

In an implementation, the network model further includes a third neural network, and the third neural network and the first neural network are parallel networks. The time-domain parameter of the historical voice frame includes an energy parameter of the historical voice frame. The one or more instructions in the computer-readable storage medium are loaded and executed by the processor 1101 to further perform the following steps: invoke the third neural network to predict the energy parameter of the historical voice frame, to obtain the energy parameter of the target voice frame, the energy parameter of the target voice frame being a parameter in the parameter set of the target voice frame.

The target voice frame includes m subframes, and the energy parameter of the target voice frame includes a gain value of each of the subframes of the target voice frame.

In this embodiment of the present disclosure, when in response to determining that the target voice frame in the voice signal may be reconstructed, the network model may be invoked to predict the frequency-domain characteristic and the time-domain parameter of the historical voice frame corresponding to the target voice frame to obtain the parameter set of the target voice frame, and then inter-parameter filtering is performed on the parameter set to reconstruct the target voice frame. The voice reconstruction and restoration process combines the signal analysis technology with the deep learning technology, which makes up for the shortcomings of traditional signal analysis technology and improves the voice processing capability. Moreover, deep learning is performed on the historical voice frame to predict the parameter set of the target voice frame, so as to reconstruct the target voice frame according to the parameter set of the target voice frame. The reconstruction process is relatively simple and efficient, and is applicable to a communication scenario having a high real-time requirement. Further, the parameter set used to reconstruct the target voice frame includes two or more parameters, so that the learning target of the network model is decomposed into a plurality of parameters. Each parameter corresponds to a different neural network for learning. A different neural network may be flexibly configured and combined according to a different parameter set to form a structure of the network model. In this way, the network structure can be greatly simplified, and the processing complexity can be effectively reduced. Continuous PLC is supported. That is to say, when a plurality of consecutive frames are lost, the plurality of consecutive frames can be reconstructed to ensure the quality of voice communication.

In another embodiment, the one or more instructions stored in the computer-readable storage medium are loaded and executed by the processor 1101 to realize the corresponding steps of the voice processing method in the embodiment shown in FIG. 3. In a specific implementation, the one or more instructions in the computer-readable storage medium are loaded and executed by the processor 1101 to perform following step: receiving a voice signal transmitted by a VoIP system; reconstructing the target voice frame by using the method shown in FIG. 4 or FIG. 5 when in response to determining that the target voice frame in the voice signal is lost; and outputting the voice signal based on the reconstructed target voice frame.

In an implementation, the one or more instructions in the computer-readable storage medium are loaded by and executed by the processor 1101 to further perform the following steps: acquiring redundant information of the target voice frame; reconstructing the target voice frame according to the redundant information of the target voice frame when in response to determining that the target voice frame in the voice signal is lost; and triggering reconstruction of the target voice frame by using the method shown in FIG. 4 or FIG. 5 when or in response to determining that the reconstruction of the target voice frame according to the redundant information of the target voice frame fails.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

In this embodiment of the present disclosure, when the target voice frame in the VoIP voice signal is lost, the voice processing method may be used to reconstruct the target voice frame. The reconstruction process by using the voice processing method is relatively simple and efficient, and is applicable to a communication scenario having a high real-time requirement. In addition, PLC is supported. That is to say, when a plurality of consecutive frames are lost, the plurality of consecutive frames can be reconstructed to ensure the quality of voice communication. Moreover, the voice processing method may be used in combination with the FEC technology. Flexible combinations are provided to avoid the adverse effect caused by the impairment of sound quality.

A person skilled in the art may understand that all or some of the procedures of the methods of the embodiments may be implemented by a computer program instructing relevant hardware. The program may be stored in a computer-readable storage medium. When the program is executed, the procedures of the method embodiments may be implemented. The storage medium may include a magnetic disc, an optical disc, a read-only memory (ROM), a random access memory (RAM), or the like.

What are disclosed above are merely examples of embodiments of the present disclosure, and are not intended to limit the protection scope of the present disclosure. Therefore, equivalent variations made in accordance with the claims of the present disclosure shall fall within the scope of the present disclosure.

What is claimed is:

1. A voice processing method, comprising:
   determining a historical voice frame corresponding to a target voice frame;
   acquiring a frequency-domain characteristic of the historical voice frame and a time-domain parameter of the historical voice frame;
   obtaining a parameter set of the target voice frame according to a correlation between the frequency-domain characteristic of the historical voice frame and the time-domain parameter of the historical voice frame, the parameter set including at least two parameters; and
   reconstructing the target voice frame according to the parameter set, wherein the network model includes a first neural network and at least two second neural networks, the first neural network is in a cascade relationship with each of the second neural networks, and one of the second neural networks corresponding to a parameter in the parameter set, and obtaining the parameter set of the target voice frame comprises:
invoking the first neural network based on the frequency-domain characteristic of the historical voice frame, to obtain a virtual frequency-domain characteristic of the target voice frame; and
inputting the virtual frequency-domain characteristic of the target voice frame and the time-domain parameter of the historical voice frame to the at least two second neural networks respectively as input information, to obtain the at least two parameters in the parameter set of the target voice frame.

2. The method according to claim 1, wherein reconstructing the target voice frame comprises:
establishing a reconstruction filter according to the parameter set;
acquiring an excitation signal of the target voice frame; and
filtering the excitation signal of the target voice frame by using the reconstruction filter to obtain the target voice frame.

3. The method according to claim 2, wherein acquiring the excitation signal of the target voice frame comprises:
acquiring an excitation signal of the historical voice frame; and
determining the excitation signal of the target voice frame according to the excitation signal of the historical voice frame.

4. The method according to claim 3, wherein the target voice frame is an nth voice frame in a voice signal transmitted by a Voice over Internet Protocol (VOIP) system, and the historical voice frame includes an $(n-t)^{th}$ voice frame to an $(n-1)^{th}$ voice frame in the voice signal transmitted by the VoIP system, n and t being both positive integers.

5. The method according to claim 4, wherein
the excitation signal of the historical voice frame includes an excitation signal of the $(n-1)^{th}$ voice frame; and
determining the excitation signal of the target voice frame comprises:
determining the excitation signal of the $(n-1)^{th}$ voice frame as the excitation signal of the target voice frame.

6. The method according to claim 4, wherein the excitation signal of the historical voice frame includes excitation signals of voice frames from the $(n-t)^{th}$ voice frame to the $(n-1)^{th}$ voice frame; and determining the excitation signal of the target voice frame comprises:
averaging the excitation signals of the $(n-t)^{th}$ voice frame to the $(n-1)^{th}$ voice frame to obtain the excitation signal of the target voice frame.

7. The method according to claim 4, wherein the excitation signal of the historical voice frame includes excitation signals of voice frames from the $(n-t)^{th}$ voice frame to the $(n-1)^{th}$ voice frame; and determining the excitation signal of the target voice frame comprises:
performing weighted summation on the excitation signals of the $(n-t)^{th}$ voice frame to the $(n-1)^{th}$ voice frame to obtain the excitation signal of the target voice frame.

8. The method according to claim 1, wherein acquiring the frequency-domain characteristic comprises:
performing short-term Fourier transform (STFT) on the historical voice frame to obtain a frequency-domain coefficient corresponding to the historical voice frame; and
extracting an amplitude spectrum from the frequency-domain coefficient corresponding to the historical voice frame as the frequency-domain characteristic of the historical voice frame.

9. The method according to claim 2, wherein in response to determining that the target voice frame is an unvoiced frame, the time-domain parameter of the historical voice frame includes a short-term correlation parameter of the historical voice frame, and the parameter set includes a short-term correlation parameter of the target voice frame; and the reconstruction filter includes a linear predictive coding (LPC) filter; and
the target voice frame includes k daughter frames, and the short-term correlation parameter of the target voice frame includes a line spectral frequency (LSF) and an interpolation factor of a $k^{th}$ daughter frame of the target voice frame, k being an integer greater than 1.

10. The method according to claim 2, wherein in response to determining that the target voice frame is a voiced frame, the time-domain parameter of the historical voice frame includes a short-term correlation parameter and a long-term correlation parameter of the historical voice frame, and the parameter set includes a short-term correlation parameter of the target voice frame and a long-term correlation parameter of the target voice frame; the reconstruction filter includes a long-term prediction (LTP) filter and an LPC filter;
the target voice frame includes k daughter frames, and the short-term correlation parameter of the target voice frame includes an LSF and an interpolation factor of a $k^{th}$ daughter frame of the target voice frame, k being an integer greater than 1; and
the target voice frame includes m subframes, and the long-term correlation parameter of the target voice frame includes a pitch lag and an LTP coefficient of each subframe of the target voice frame, m being a positive integer.

11. The method according to claim 1, wherein the network model further includes a third neural network, a network formed by the first neural network, each of the second neural networks, and the third neural network being a parallel network; and the time-domain parameter of the historical voice frame includes an energy parameter of the historical voice frame; and
obtaining the parameter set of the target voice frame comprises:
inputting the virtual frequency-domain characteristic of the target voice frame and the energy parameter of the historical voice frame to the at least two second neural networks respectively as input information, to obtain the at least two parameters of the target voice frame;
invoking the third neural network based on the energy parameter of the historical voice frame, to obtain an energy parameter of the target voice frame; and
forming the parameter set of the target voice frame by the at least two parameters of the target voice frame and the energy parameter of the target voice frame,
the target voice frame including m subframes, and the energy parameter of the target voice frame including a gain value of each of the subframes of the target voice frame.

12. A voice processing apparatus, comprising: a memory storing computer program instructions; and a processor coupled to the memory and configured to execute the computer program instructions and perform:

determining a historical voice frame corresponding to a target voice frame;

acquiring a frequency-domain characteristic of the historical voice frame and a time-domain parameter of the historical voice frame;

obtaining a parameter set of the target voice frame according to a correlation between the frequency-domain characteristic of the historical voice frame and the time-domain parameter of the historical voice frame, the parameter set including at least two parameters; and reconstructing the target voice frame according to the parameter set, wherein the network model includes a first neural network and at least two second neural networks, the first neural network is in a cascade relationship with each of the second neural networks, and one of the second neural networks corresponding to a parameter in the parameter set, and obtaining the parameter set of the target voice frame comprises:

invoking the first neural network based on the frequency-domain characteristic of the historical voice frame, to obtain a virtual frequency-domain characteristic of the target voice frame; and inputting the virtual frequency-domain characteristic of the target voice frame and the time-domain parameter of the historical voice frame to the at least two second neural networks respectively as input information, to obtain the at least two parameters in the parameter set of the target voice frame.

13. The voice processing apparatus according to claim 12, wherein reconstructing the target voice frame includes:

establishing a reconstruction filter according to the parameter set;

acquiring an excitation signal of the target voice frame; and filtering the excitation signal of the target voice frame by using the reconstruction filter to obtain the target voice frame.

14. The voice processing apparatus according to claim 13, wherein acquiring the excitation signal of the target voice frame includes:

acquiring an excitation signal of the historical voice frame; and determining the excitation signal of the target voice frame according to the excitation signal of the historical voice frame.

15. The voice processing apparatus according to claim 14, wherein the target voice frame is an nth voice frame in a voice signal transmitted by a Voice over Internet Protocol (VOIP) system, and the historical voice frame includes an $(n-t)^{th}$ voice frame to an $(n-1)^{th}$ voice frame in the voice signal transmitted by the VoIP system, n and t being both positive integers.

16. The voice processing apparatus according to claim 15, wherein the excitation signal of the historical voice frame includes an excitation signal of the $(n-1)^{th}$ voice frame; and determining the excitation signal of the target voice frame comprises:

determining the excitation signal of the $(n-1)^{th}$ voice frame as the excitation signal of the target voice frame.

17. The voice processing apparatus according to claim 15, wherein the excitation signal of the historical voice frame includes excitation signals of voice frames from the $(n-t)^{th}$ voice frame to the $(n-1)^{th}$ voice frame; and determining the excitation signal of the target voice frame comprises:

averaging the excitation signals of the $(n-t)^{th}$ voice frame to the $(n-1)^{th}$ voice frame to obtain the excitation signal of the target voice frame.

18. A non-transitory computer-readable storage medium storing computer program instructions executable by at least one processor to perform:

determining a historical voice frame corresponding to a target voice frame;

acquiring a frequency-domain characteristic of the historical voice frame and a time-domain parameter of the historical voice frame;

obtaining a parameter set of the target voice frame according to a correlation between the frequency-domain characteristic of the historical voice frame and the time-domain parameter of the historical voice frame, the parameter set including at least two parameters; and reconstructing the target voice frame according to the parameter set, wherein the network model includes a first neural network and at least two second neural networks, the first neural network is in a cascade relationship with each of the second neural networks, and one of the second neural networks corresponding to a parameter in the parameter set, and obtaining the parameter set of the target voice frame comprises:

invoking the first neural network based on the frequency-domain characteristic of the historical voice frame, to obtain a virtual frequency-domain characteristic of the target voice frame; and inputting the virtual frequency-domain characteristic of the target voice frame and the time-domain parameter of the historical voice frame to the at least two second neural networks respectively as input information, to obtain the at least two parameters in the parameter set of the target voice frame.

\* \* \* \* \*